(12) United States Patent
Sakakibara et al.

(10) Patent No.: US 12,370,772 B2
(45) Date of Patent: Jul. 29, 2025

(54) MICROPOROUS FILM, AND METHOD FOR PRODUCING SAME

(71) Applicant: Asahi Kasei Battery Separator Corporation, Tokyo (JP)

(72) Inventors: Yuzuru Sakakibara, Tokyo (JP); Xun Zhang, Tokyo (JP); Yuka Sato, Tokyo (JP); Kosuke Mizobuchi, Tokyo (JP)

(73) Assignee: Asahi Kasei Battery Separator Corporation, Tokyo (JP)

( * ) Notice: Subject to any disclaimer, the term of this patent is extended or adjusted under 35 U.S.C. 154(b) by 164 days.

(21) Appl. No.: 17/795,210

(22) PCT Filed: Jan. 29, 2021

(86) PCT No.: PCT/JP2021/003415
§ 371 (c)(1),
(2) Date: Jul. 25, 2022

(87) PCT Pub. No.: WO2021/153792
PCT Pub. Date: Aug. 5, 2021

(65) Prior Publication Data
US 2023/0056490 A1 Feb. 23, 2023

(30) Foreign Application Priority Data

Jan. 31, 2020 (JP) .................. 2020-015775
Jun. 29, 2020 (JP) .................. 2020-111899

(51) Int. Cl.
*B32B 3/30* (2006.01)
*B29C 48/00* (2019.01)
(Continued)

(52) U.S. Cl.
CPC ............ *B32B 3/30* (2013.01); *B29C 48/0013* (2019.02); *B29C 48/0018* (2019.02);
(Continued)

(58) Field of Classification Search
None
See application file for complete search history.

(56) References Cited

U.S. PATENT DOCUMENTS 4,376,046 A 3/1983 Deutsch
5,968,643 A * 10/1999 Topolkaraev .............. C08J 9/18
521/142
(Continued)

FOREIGN PATENT DOCUMENTS

CN 102468466 A 5/2012
EP 2444453 A1 4/2012
(Continued)

OTHER PUBLICATIONS

Niihara, Y., Rolled Item of Fine Porous Membrane, Apr. 2, 2004, machine translation of JP2004-099799 (Year: 2004).*
(Continued)

*Primary Examiner* — Chinessa T. Golden
(74) *Attorney, Agent, or Firm* — Morgan, Lewis & Bockius LLP

(57) ABSTRACT

Provided is a microporous film which has a surface A and a surface B opposite to the surface A. In one embodiment, the microporous film has a ratio ($F_B/F_A$) of a dynamic friction coefficient $F_B$ of the surface B to a dynamic friction coefficient $F_A$ of the surface A of 1.2 to 20. In another embodiment, the microporous film is a single layer having a thickness of 3-18 µm, a number $N_A$ of pores on the surface A is 10-100/µm², a number $N_B$ of pores on the surface B is 20-200/µm², and $N_A/N_B$ is 0.2-0.96. In addition, a total area $S_A$ of pores on the surface A is 0.02-0.5 µm²/µm², a total area $S_B$ of pores on the surface B is 0.01-0.3 µm²/µm², and $S_A/S_B$ is 1.1-10. Furthermore, in another embodiment, a number $W_B$ of protrusion-like bodies on the surface B is 0.2-1000/100 µm².

14 Claims, 7 Drawing Sheets

(a)

(b)

(51) Int. Cl.
B29C 48/21 (2019.01)
B29C 48/275 (2019.01)
B32B 3/26 (2006.01)
B29K 23/00 (2006.01)
B29K 105/00 (2006.01)
B29K 105/04 (2006.01)
B29K 105/12 (2006.01)
B29L 7/00 (2006.01)
B29L 9/00 (2006.01)

(52) U.S. Cl.
CPC ............ B29C 48/022 (2019.02); B29C 48/21 (2019.02); B29C 48/278 (2019.02); B32B 3/26 (2013.01); *B29K 2023/06* (2013.01); *B29K 2023/12* (2013.01); *B29K 2105/0038* (2013.01); *B29K 2105/041* (2013.01); *B29K 2105/122* (2013.01); *B29K 2995/0094* (2013.01); *B29L 2007/002* (2013.01); *B29L 2009/00* (2013.01)

(56) References Cited

U.S. PATENT DOCUMENTS

| | | | |
|---|---|---|---|
| 2006/0141238 | A1 | 6/2006 | Sasaki et al. |
| 2010/0151310 | A1 | 6/2010 | Takita et al. |
| 2012/0015229 | A1 | 1/2012 | Ohashi et al. |
| 2012/0101180 | A1* | 4/2012 | Yamada ................ B29C 55/143 521/143 |
| 2012/0202102 | A1 | 8/2012 | Kakibe et al. |
| 2013/0196208 | A1 | 8/2013 | Nemoto |
| 2015/0037653 | A1 | 2/2015 | Saito et al. |
| 2015/0303429 | A1 | 10/2015 | Kobayashi |
| 2015/0314241 | A1* | 11/2015 | Hester .................... B01D 65/08 210/322 |
| 2016/0214069 | A1 | 7/2016 | Ding et al. |
| 2017/0033348 | A1* | 2/2017 | Murakami ............ H01M 4/131 |

FOREIGN PATENT DOCUMENTS

| | | | |
|---|---|---|---|
| EP | 3340342 | A1 | 6/2018 |
| JP | H05-258741 | A | 10/1993 |
| JP | H11-123799 | A | 5/1999 |
| JP | 2000-198866 | A | 7/2000 |
| JP | 2004099799 | A * | 4/2004 |
| JP | 2007-238822 | A | 9/2007 |
| JP | 2009-001817 | A | 1/2009 |
| JP | 2009-114434 | A | 5/2009 |
| JP | 2009-227819 | A | 10/2009 |
| JP | 2010-036355 | A | 2/2010 |
| JP | 2011-051330 | A | 3/2011 |
| JP | 5596768 | B2 | 9/2014 |
| JP | 2015-163465 | A | 9/2015 |
| JP | 2017-029338 | A | 2/2017 |
| JP | 2019-072901 | A | 5/2019 |
| JP | 2019-206773 | A | 12/2019 |
| KR | 10-2016-0111547 | A | 9/2016 |
| WO | 2004/024808 | A1 | 3/2004 |
| WO | 2012/043718 | A1 | 4/2012 |
| WO | 2014/084061 | A1 | 6/2014 |
| WO | 2015/190264 | A1 | 12/2015 |
| WO | 2018/180713 | A1 | 10/2018 |

OTHER PUBLICATIONS

International Search Report issued in corresponding International Patent Application No. PCT/JP2021/003415 dated Apr. 27, 2021.
International Preliminary Report on Patentability and Written Opinion issued in corresponding International Patent Application No. PCT/JP2021/003415 dated Aug. 11, 2022.
Partial Supplementary European Search Report issued in corresponding European Patent Application No. 21747554.0 dated Jun. 9, 2023.
Supplementary European Search Report issued in European Patent Application No. 21747554.0 dated Oct. 16, 2023.

* cited by examiner

FIG. 1
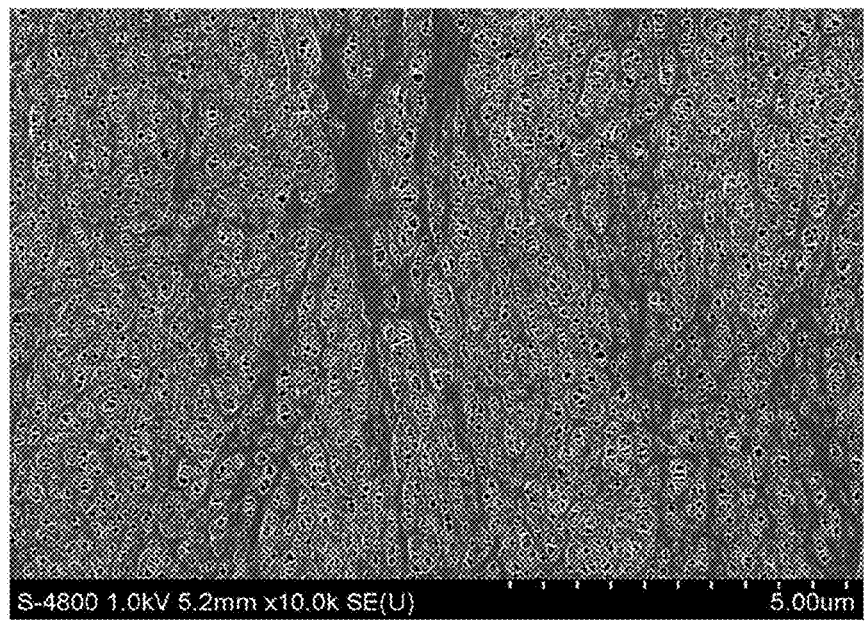
(a)
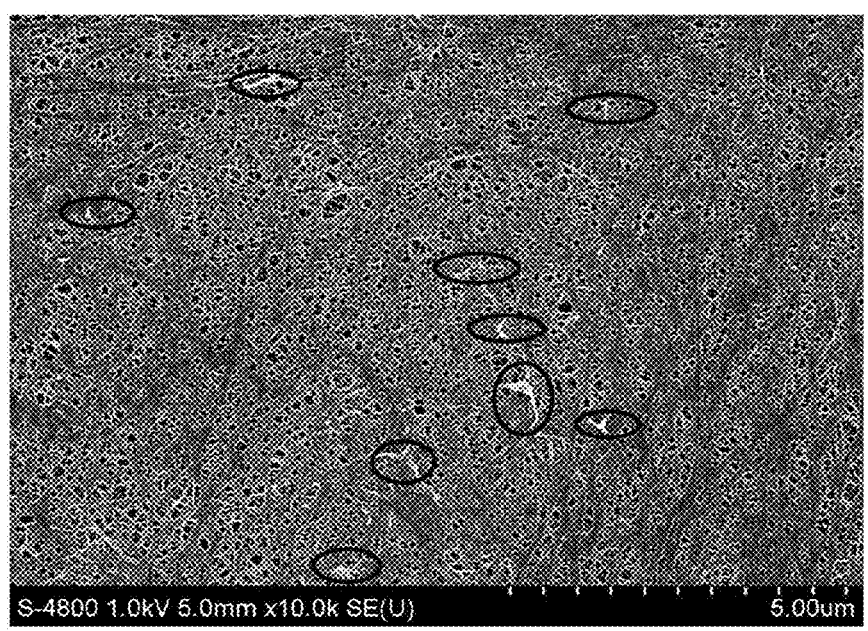
(b)

FIG. 4
(A)
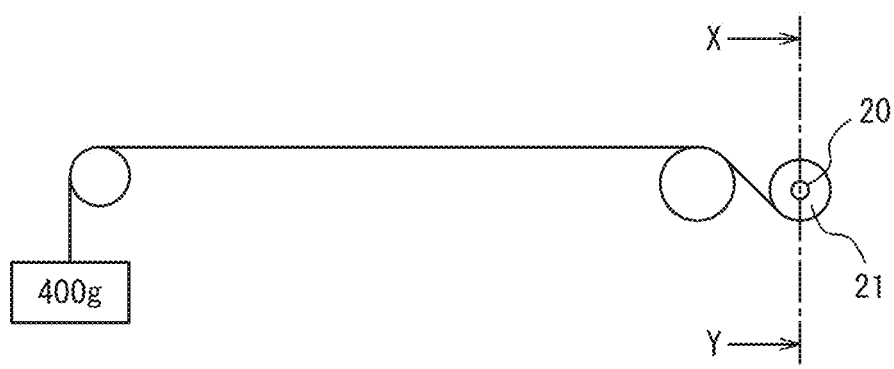
(B)
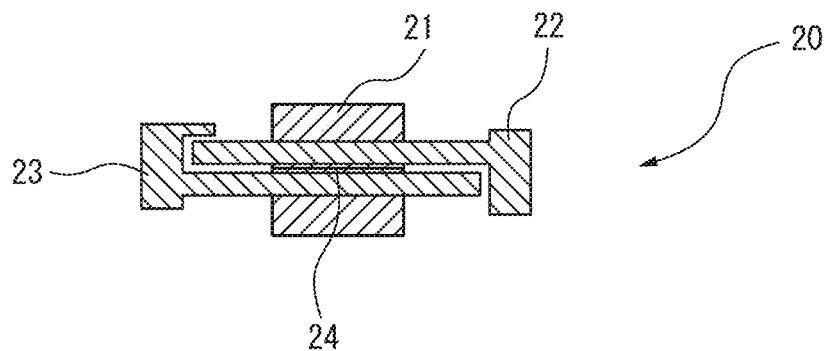

FIG. 6
(A)
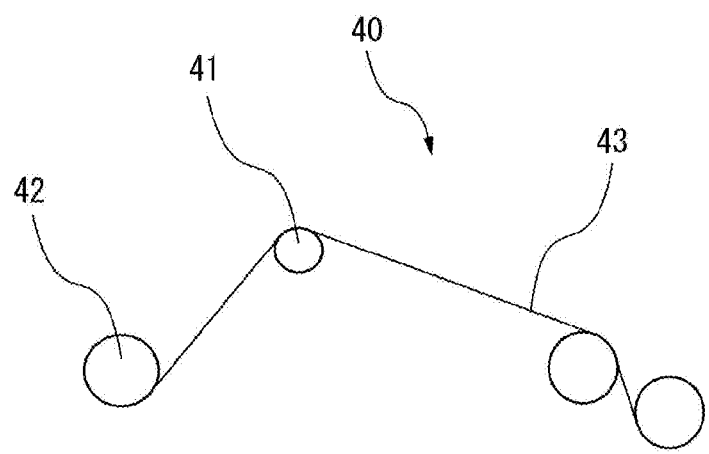
(B)
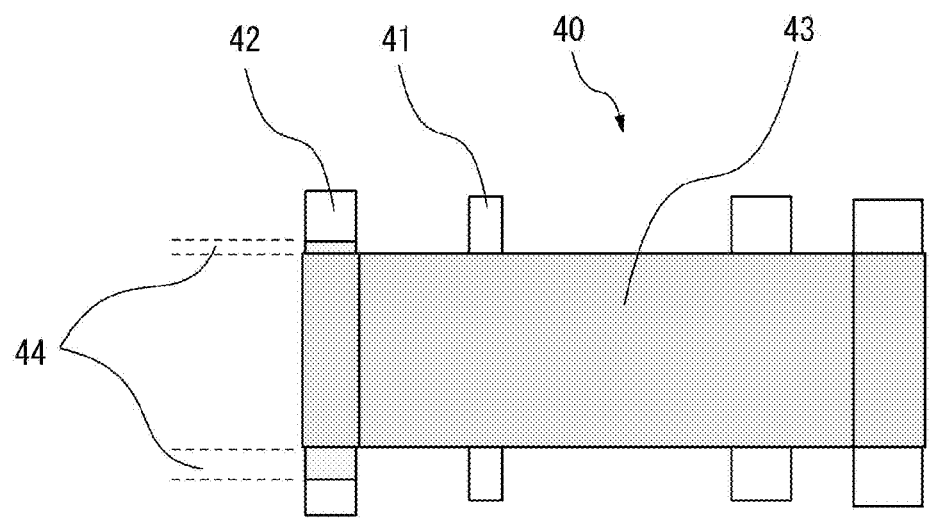

MICROPOROUS FILM, AND METHOD FOR PRODUCING SAME

FIELD

The present disclosure relates to a microporous membrane and a method for producing the same.

BACKGROUND

Lithium-ion secondary cells have become widespread in smartphones or portable mobile devices, and the market for in-vehicle applications such as hybrid cars and electric vehicles is rapidly expanding. Along with this trend, the demand for separators used in lithium-ion secondary cells is also increasing. Microporous membranes made of a polyolefin-based resin such as polyethylene or polypropylene, a polyamide, or any of these resins blended with an inorganic filler, or any of the above microporous membranes with an inorganic filler-containing coating liquid or an aramid resin applied thereon are often used as the separator. As a starting resin for the separator, a polyolefin-based resin such as polyethylene or polypropylene, which has a good balance of molded product properties, molding processability and weather resistance, is satisfactorily used.

Methods for producing a polyolefin-based resin separator are mainly divided into two types. One type is called a wet method or a heat-induced phase separation method, as described in PTL 1, which typically comprises mixing a plasticizer such as paraffin with a polyethylene resin inside an extruder or premixing these components appropriately; extruding with a T-die; phase-separating the resin and the plasticizer during cooling with a casting apparatus; and extracting the plasticizer with a solvent to open pores in the extruded compact. This method may further comprise applying an orientation to the extruded compact by stretching the extruded compact with a uniaxial or biaxial stretcher before or after extracting the plasticizer, reducing the thickness of the microporous membrane, or adjusting the pore shape to obtain a microporous membrane having the desired characteristics. The stretching step may be split into a plurality of steps. In this method, the portion of the membrane in which the plasticizer is phase-separated by casting becomes pores after the plasticizer is extracted. Since simultaneous or successive biaxial stretching can be readily used in this method, a microporous membrane having superior isotropic strength is easily obtained.

The other type is called a stretch pore-opening method or a dry method, as described in PTL 2, which typically comprises extruding a polyolefin resin without adding a plasticizer; quenching a molten original membrane extruded from a T-die with an air knife; cooling and solidifying with a cast roll apparatus while pulling under the condition that the drawdown ratio (value obtained by dividing the cross-sectional area of a film after cooling and solidification by the cross-sectional area of the outlet of the die) is several tens to several hundreds in the MD (flow direction of the film, longitudinal direction) to obtain a pre-stretched original membrane; and guiding the pre-stretched original membrane to a stretcher, carrying out MD stretching at room temperature (normally 10° C. to 30° C.), and continuously carrying out MD stretching at a higher temperature than room temperature to open pores. This method is also generally called lamella pore opening. It is known that by adjusting the drawdown ratio to several tens to several hundreds, when the molecular chains of the extruded polyolefin are crystallized, a structure in which the c-axis of the polyolefin crystal lamella is arranged in the MD and the a-axis is aligned in the TD (transverse direction of the film with respect to the flow direction) is formed, and in addition, during subsequent MD stretching, these lamellae are cleaved to form pores. Since a microporous membrane obtained by a dry method (dry membrane) is generally subjected to MD stretching only, TD shrinkage does not occur. Therefore, in cells that avoid TD shrinkage, a dry membrane is effectively used as a separator. In PTL 2, a dry method is applied to a laminated body having a three-layer structure formed by using the same type of polyolefin.

CITATION LIST

Patent Literature

[PTL 1] Japanese Unexamined Patent Publication (Kokai) No. 2010-036355
[PTL 2] Japanese Unexamined Patent Publication (Kokai) No. 11-123799
[PTL 3] Japanese Unexamined Patent Publication (Kokai) No. 2011-51330
[PTL 4] Japanese Unexamined Patent Publication (Kokai) No. 2009-114434
[PTL 5] Japanese Unexamined Patent Publication (Kokai) No. 2017-029338
[PTL 6] WO 2015/190264
[PTL 7] Japanese Unexamined Patent Publication (Kokai) No. 5-258741
[PTL 8] WO 2014/084061
[PTL 9] Japanese Patent Publication No. 5596768

SUMMARY

Technical Problem

With the conventional separators as described in PTL 1 to 4, there was room for improvement in the productivity of lithium-ion secondary cells. Specifically, in the case of wound cylindrical lithium-ion secondary cells, which are mainly used for consumer applications such as smartphones and notebook computers, or wound square-type lithium-ion cells for in-vehicle applications, a wound body of a lithium-ion secondary cell is produced in a winding step of the cell production, where one surface of the separator is brought into contact with a winding core and wound thereabout, and the winding core is removed after winding. If the dynamic friction coefficient of the contact surface of the separator is high in this removal step, the winding core cannot be removed without destroying the wound body in the removal step, and production efficiency deteriorates. For this reason, the dynamic friction coefficient is generally required to be low (hereinafter, this property is also referred to as "winding core removability"). This tendency similarly applies to pouch-type cells for which a winding core is used in the production of a wound body.

However, if the friction coefficient is too low, when a roll in which only a separator is wound around a paper tube (hereinafter, also referred to as "membrane production original roll") is placed vertically in a separator production process or a cell production process, a phenomenon in which the separator slips off under the weight of the membrane itself (hereinafter, also referred to as "slip phenomenon") may occur. Recently, to improve the efficiency of the production process, there is a tendency to increase the amount of winding on the membrane production original roll, and the amount of one roll reaches, for example, several thousand meters. At that time, for example, if the separator original membrane having a width of 1 m is wound up to 5000 m, the roll reaches about 50 kg. The longer the winding length, the heavier the weight, and the slip phenomenon is more likely to occur, which can be a problem in the future. Further, the slip phenomenon is more likely to occur at lower temperatures. To reduce the slip phenomenon, it is necessary that the friction coefficient of the separator be appropriately high. The above slip phenomenon is a phenomenon that occurs due to gravity when a membrane production original roll is placed vertically, and thus likely to occur with a wide separator. However, the same phenomenon occurs with a slit roll obtained by winding a membrane slit into a narrow width, for example, a width of about 65 mm. Further, in a non-wound-type cell such as pouch type, an appropriate frictional force is required in the separator to reduce a phenomenon in which a separator slips in the planar direction with respect to an electrode. As described above, it is necessary that the friction coefficient of the separator be low to improve winding core removability and high to reduce slip phenomenon.

To address such a problem, using a layer that is easily applied on one surface of a separator by applying the coextrusion method of PTL 5 has been considered. However, in this case, it is necessary to additionally provide a new layer having good adhesion to the base layer, while the performance of the base layer such as strength and permeability is diminished, the fixed cost from requiring a plurality of separator extruders is increased, and the process is complicated, which significantly increases production cost.

Therefore, an object of the present disclosure is to provide a microporous membrane having superior cell productivity, in particular, removability from a winding core when producing a wound cell using a winding core and reduction of slip phenomenon of a separator in roll form, and a method for producing the same.

Solution to Problem

Embodiments of the present disclosure are listed in the following items [1] to [32].

[1]

A microporous membrane having a surface A and a surface B opposite to the surface A, wherein a ratio ($F_B/F_A$) of a dynamic friction coefficient of the surface B ($F_B$) to a dynamic friction coefficient of the surface A ($F_A$) is in a range of 1.2 to 20.

[2]

The microporous membrane according to item 1, wherein a number of pores per 1 $\mu m^2$ on the surface A ($N_A$) is 10/$\mu m^2$ to 100/$\mu m^2$, a number of pores per 1 $\mu m^2$ on the surface B ($N_B$) is 20/$\mu m^2$ to 200/$\mu m^2$, $N_A/N_B$ is 0.2 to 0.98, a sum of pore areas per 1 $\mu m^2$ on the surface A ($S_A$) is 0.02 $\mu m^2$ to 0.5 $\mu m^2$, a sum of pore areas per 1 $\mu m^2$ on the surface B ($S_B$) is 0.01 $\mu m^2$ to 0.3 $\mu m^2$, and $S_A/S_B$ is 1.1 to 10.

[3]

A microporous membrane composed of a single layer,
wherein the microporous membrane has a thickness of 3 $\mu m$ to 18 $\mu m$;
when one surface of the microporous membrane is a surface A, the other surface is a surface B, a number of pores per 1 $\mu m^2$ of the surface A is $N_A$, and a number of pores per 1 $\mu m^2$ of the surface B is $N_B$, $N_A$ is 10/$m^2$ to 100/$\mu m^2$, $N_B$ is 20/$\mu m^2$ to 200/$m^2$, and $N_A/N_B$ is 0.2 to 0.96; and
when a sum of pore areas per 1 $\mu m^2$ of the surface A is $S_A$ and a sum of pore areas per 1 $\mu m^2$ of the surface B is $S_B$, $S_A$ is 0.02 $\mu m^2/\mu m^2$ to 0.5 $\mu m^2/\mu m^2$, $S_B$ is 0.01 $\mu m^2/\mu m^2$ to 0.3 $\mu m^2/\mu m^2$, and $S_A/S_B$ is 1.1 to 10.

[4]

The microporous membrane according to item 3, wherein a ratio $F_B/F_A$ of a dynamic friction coefficient of the surface B ($F_B$) to a dynamic friction coefficient of the surface A ($F_A$) is 1.2 or greater.

[5]

The microporous membrane according to any one of items 1 to 4, wherein the surface B has a plurality of protrusions, and a number of the protrusions per 100 $\mu m^2$ on the surface B ($W_B$) is in a range of 0.2/100 $\mu m^2$ to 1000/100 $\mu m^2$.

[6]

A microporous membrane having a surface A and a surface B opposite to the surface A,
wherein the surface B has a plurality of protrusions, and a number of the protrusions per 100 $\mu m^2$ on the surface B ($W_B$) is in a range of 0.2/100 $\mu m^2$ to 1000/100 $\mu m^2$.

[7]

The microporous membrane according to item 6, wherein a number of pores per 1 $\mu m^2$ on the surface A ($N_A$) is 10/$\mu m^2$ to 100/$\mu m^2$, a number of pores per 1 $\mu m^2$ on the surface B ($N_B$) is 20/$\mu m^2$ to 200/$\mu m^2$, $N_A/N_B$ is 0.2 to 0.98, a sum of pore areas per 1 $\mu m^2$ on the surface A ($S_A$) is 0.02 $\mu m^2$ to 0.5 $\mu m^2$, a sum of pore areas per 1 $\mu m^2$ on the surface B ($S_B$) is 0.01 $\mu m^2$ to 0.3 $\mu m^2$, and $S_A/S_B$ is 1.1 to 10.

[8]

The microporous membrane according to item 6 or 7, wherein a ratio $F_B/F_A$ of a dynamic friction coefficient of the surface B ($F_B$) to a dynamic friction coefficient of the surface A ($F_A$) is 1.2 or greater.

[9]

The microporous membrane according to any one of items 1 to 8, wherein the surface A has a dynamic friction coefficient ($F_A$) of 0.3 or less and the surface B has a dynamic friction coefficient ($F_B$) of 0.9 or less.

[10]

The microporous membrane according to any one of items 1 to 9, wherein the microporous membrane has a thickness of 3 $\mu m$ to 18 $\mu m$, a porosity of 20% to 75%, a puncture strength of 300 gf/10 $\mu m$ or more in terms of 10 $\mu m$ thickness, and an air permeability of 30 sec/100 ml/10 $\mu m$ to 1000 sec/100 ml/10 $\mu m$ in terms of 10 $\mu m$ thickness.

[11]

The microporous membrane according to any one of items 1 to 10, wherein the surface A has a plurality of protrusions, a number $W_A$ of the protrusions per 100 $\mu m^2$ on the surface A is less than 0.2/100 $\mu m^2$, and the surface B has a plurality of protrusions, a number $W_B$ of the protrusions per 100 $\mu m^2$ on the surface B is greater than $10 \times W_A$.

[12]

The microporous membrane according to any one of items 1 to 11, wherein the surface B has a plurality of protrusions, and the protrusions on the surface B have a size in a range of 0.01 $\mu m$ to 5 $\mu m$ when the surface B is observed from a front face.

[13]

The microporous membrane according to any one of items 1 to 12, wherein the surface B has a plurality of protrusions, and the protrusions on the surface B contain polyethylene or polypropylene as a main component.

[14]

The microporous membrane according to any one of items 1 to 13, wherein when a ratio (%) of a number of pores having a pore size of 0.12 $\mu m$ or more to a total number of pores observed in a vicinity of the surface A in a cross-section of the microporous membrane is $NC_A(0.12)$, a ratio (%) of a number of pores having a pore size of 0.12 μm or more to a total number of pores observed in a vicinity of a center in a cross-sectional direction in the cross-section of the microporous membrane is $NC_M(0.12)$, and a ratio (%) of a number of pores having a pore size of 0.12 μm or more to a total number of pores observed in a vicinity of the surface B in the cross-section of the microporous membrane is $NC_B(0.12)$, then $NC_A(0.12) > NC_M(0.12) > NC_B(0.12)$, provided that when a position on the surface A is defined as 0% and a position on the surface B is defined as 100% in the thickness direction of a cross-section of the microporous membrane, the vicinity of the surface A means a region of 0% to 10%, the vicinity of the center means a region of 45% to 55%, and the vicinity of the surface B means a region of 90% to 100%.

[15]

The microporous membrane according to item 14, wherein $NC_A(0.12)/NC_B(0.12) > 1.2$ is further satisfied.

[16]

The microporous membrane according to item 14 or 15, wherein $NC_A(0.12)$ is 2% to 5% and $NC_B(0.12)$ 0.5% to 3.0%.

[17]

The microporous membrane according to any one of items 1 to 16, wherein when a ratio (%) of a number of pores having a pore size of less than 0.1 μm to a total number of pores observed in a vicinity of the surface A in a cross-section of the microporous membrane is $NC_A(0.10)$, a ratio (%) of a number of pores having a pore size of less than 0.10 μm to a total number of pores observed in a vicinity of a center in a cross-sectional direction in the cross-section of the microporous membrane is $NC_M(0.10)$, and a ratio (%) of a number of pores having a pore size of less than 0.10 μm to a total number of pores observed in a vicinity of the surface B in the cross-section of the microporous membrane is $NC_B(0.10)$, then $NC_A(0.10) < NC_M(0.10) < NC_B(0.10)$, provided that when a position on the surface A is defined as 0% and a position on the surface B is defined as 100% in the thickness direction of a cross-section of the microporous membrane, the vicinity of the surface A means a region of 0% to 10%, the vicinity of the center means a region of 45% to 55%, and the vicinity of the surface B means a region of 90% to 100%.

[15]

The microporous membrane according to any one of items 1 to 13, wherein the surface A and the surface B of the microporous membrane contain polyethylene as a main component.

[19]

The microporous membrane according to any one of items 1 to 14, wherein the surface A and the surface B of the microporous membrane contain polyethylene as a main component, and the polyethylene comprises 5 wt % to 30 wt % of a component having a viscosity-average molecular weight of 2,000,000 or greater.

[20]

The microporous membrane according to any one of items 1 to 15, wherein the surface A and the surface B of the microporous membrane contain polyethylene as a main component, and the polyethylene contains 10 wt % or more of an ultra-high molecular weight polyethylene having a viscosity weight molecular weight of 500,000 to 900,000.

[21]

The microporous membrane according to any one of items 1 to 16, wherein the surface A and the surface B of the microporous membrane comprise 20 wt % or more of an ultra-high molecular weight component having a viscosity-average molecular weight of 1,000,000 or greater.

[22]

The microporous membrane according to any one of items 1 to 17, wherein the microporous membrane has a puncture strength of 300 gf/10 μm or more and 1200 gf/10 μm or less in terms of 10 μm thickness.

[23]

The microporous membrane according to any one of items 11 to 18, wherein when an average pore size of pores observed in the surface B of the microporous membrane is $\Phi_B$, $\Phi_B$ is in a range of 5 nm to 100 nm.

[24]

The microporous membrane according to any one of items 11 to 19, wherein when an average pore size of pores observed in the surface A of the microporous membrane is $\Phi_A$ and an average pore size of pores observed in the surface B of the microporous membrane is $\Phi_B$, $\Phi_A > \Phi_B$.

[25]

A separator for lithium-ion secondary cells, comprising the microporous membrane according to any one of items 1 to 20.

[26]

A method for producing a microporous membrane, comprising the following:
a step of forming a microporous membrane having a surface A and a surface opposite to the surface A by a wet process; and
a step of attaching protrusions containing polyethylene or polypropylene having a fiber diameter of 1 μm to 10 μm as a main component to the surface B of the microporous membrane.

[27]

A method for producing a microporous membrane, comprising the following:
a coextrusion step of molding a microporous original membrane comprising a target layer having a surface A and a surface B opposite to the surface A and a supplementary layer on the surface B of the target layer by coextrusion of the target layer and the supplementary layer, wherein the target layer contains 40 wt % or more of a plasticizer based on a total weight of the target layer and the supplementary layer contains 60 wt % or less of a plasticizer based on a total weight of the supplementary layer; and
the following (a) to (c) in any order after the coextrusion step:
(a) a stretching step of stretching the microporous original membrane;
(b) an extraction step of extracting the plasticizer from the microporous original membrane in the presence of an extraction solvent; and
(c) a peeling step of peeling the supplementary layer from the surface B of the target layer to obtain the target layer as a microporous membrane.

[28]

The method according to item 23, wherein the target layer is a single layer.

[29]

The method according to item 23 or 24, wherein a starting resin of the target layer contains polyethylene as a main component and a starting resin of the supplementary layer contains polypropylene as a main component.

[30]

The method according to any one of items 23 to 25, wherein the supplementary layer after the peeling step is a microporous membrane having an air permeability of 3000 sec/100 ml or more or a poreless membrane.

[31]

The method according to any one of items 23 to 26, wherein the content of the plasticizer in the target layer is 90 wt % or less, and/or the content of the plasticizer in the supplementary layer is more than 0 wt %.

[32]

The method according to any one of items 23 to 27, further comprising an application step of applying a coating material to the target layer after the peeling step.

Advantageous Effects of Invention

According to the present disclosure, a microporous membrane having superior cell productivity, in particular, removability from a winding core when producing a wound cell using a winding core and reduction of slip phenomenon of a separator in roll form can be obtained.

BRIEF DESCRIPTION OF DRAWINGS

FIG. 1(a) is a surface photograph of one surface (surface A) of the microporous membrane of the present disclosure.
FIG. 1(b) is a surface photograph of the other surface (surface B) of the same microporous membrane where protrusions are present.
FIG. 4 is a schematic diagram showing a method for evaluating winding core removability in the specification of the present application.
FIG. 6 is a schematic diagram showing a method for evaluating transportability in the specification of the present application.

DESCRIPTION OF EMBODIMENTS

<<Layer Structure of Microporous Membrane>>

Figure 2:
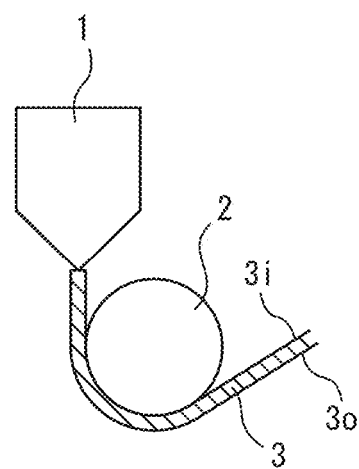
FIG. 2 is a schematic drawing partially illustrating a production line for the microporous membrane of the present disclosure.

In the microporous membrane of the present disclosure (hereinafter, referred to as "target layer"), one surface is distinguished as "surface A" and the other surface opposite to the surface A as "surface B". The material constituting the surface A may be substantially the same as or different from the material constituting the surface B. The microporous membrane can be used as a separator for an electricity storage element, such as a separator for a lithium-ion secondary cell. The microporous membrane may be of a single layer. A single layer means that the microporous membrane is composed of a microporous membrane in a single-layer membrane without using a lamination method or an application method. However, when obtaining a single-layer membrane, a target layer (single-layer membrane) and a supplementary layer may be coextruded in two or more layers, and the supplementary layer is peeled off in the production process to obtain the target layer (single-layer membrane). The microporous membrane may be a multi-layer membrane, such as a coextruded dual-type, three-layer structure having the same surface layers. In the case of a multilayer membrane, it is preferable that the material constituting the surface A be substantially the same as the material constituting the surface B. When obtaining a multilayer membrane, the target layer (multilayer membrane) and the supplementary layer may be coextruded, and the supplementary layer is peeled off in the production process to obtain the target layer (multilayer membrane). In both the single-layer membrane and the multilayer membrane, the side in contact with the supplementary layer is surface B (the side having a high dynamic friction coefficient) of the target layer, and the other side is surface A. The supplementary layer serves a function as a processed supplementary layer from which a microporous membrane can be easily obtained. By the action of this supplementary layer, the dynamic friction coefficient of the surface B side in contact with the supplementary layer is easily increased from the dynamic friction coefficient of the surface A, and the total pore area on the surface B side in contact with the supplementary layer is easily decreased from the total pore area on the surface A. When a supplementary layer is peeled off to obtain a target layer, a portion of the peeled supplementary layer may adhere to the surface B. In the case where "the material constituting the surface A is substantially the same as the material constituting the surface B" described in the specification of the present application, the presence of a supplementary layer remaining on the surface B is not taken into consideration.

<<Features of Microporous Membrane>>

When one surface of the microporous membrane is surface A, the surface opposite to the surface A is surface B, the dynamic friction coefficient of the surface A is $F_A$, and the dynamic friction coefficient of the surface B is $F_B$, $F_A$ is preferably 0.3 or less, more preferably 0.02 to 0.3, and even more preferably 0.1 to 0.3. $F_B$ is preferably 0.9 or less, more preferably 0.1 to 0.9, even more preferably 0.5 or less, and still more preferably 0.1 to 0.5. The ratio ($F_B/F_A$) of $F_B$ to $F_A$ is preferably in the range of 1.2 to 20. Specifically, of the surface A and the surface B, the surface B has a higher dynamic friction coefficient. When $F_B/F_A$ is 1.2 to 20, the adhesion of the coating layer and the removability of the microporous membrane from a winding core during cell winding are both easily achieved. $F_B/F_A$ is preferably in the range of 1.2 to 10. Since the slip phenomenon occurs where the surface A and the surface B are in contact with each other, it is particularly preferable that there be a balance of both adhesion and removability, i.e., $F_B/F_A$ be in the above ranges, in order to reduce the slip phenomenon.

The microporous membrane preferably has an $F_A$ in the range of 0.02 to 0.3 and an $F_B$ in the range of 0.1 to 0.9. By having an $F_A$ of 0.02 or greater, the microporous membrane can be more reliably fixed to a winding core when the winding core is brought into contact with the surface A during cell winding. By having an $F_A$ of 0.3 or less, the removability from the winding core is improved. $F_A$ is in the range of preferably 0.05 to 0.25, and more preferably 0.1 to 0.2. In addition, by having an $F_B$ of 0.1 or greater, slip phenomenon can be reduced, and a separator can be satisfactorily wound without slipping excessively during winding. By having an $F_B$ of 0.9 or less, slidability between a separator and the portion of the winder in contact with the separator during cell winding is improved, transportability is satisfactory, and cell productivity is improved. The slip phenomenon can also be satisfactorily reduced. $F_B$ is preferably in the range of 0.1 to 0.7, and more preferably in the range of 0.31 to 0.6.

For the microporous membrane which has one surface as surface A and the other surface as surface B, when the number of pores on the surface A of 1 µm$^2$ is $N_A$ and the number of pores on the surface B of 1 µm$^2$ is $N_B$, $N_A$ is preferably 10/m$^2$ to 100/m$^2$ and $N_B$ is preferably 20/µm$^2$ to 200/m$^2$. The ratio ($N_A/N_B$) of $N_A$ to $N_B$ is preferably 0.2 to 0.98. When $N_A$ is 10/µm$^2$ or greater, the dynamic friction coefficient is not excessively increased, unsatisfactory core removal can be suppressed, and lithium-ion permeability is improved. When $N_A$ is 100/µm$^2$ or less, micro-short circuit is suppressed and membrane strength is also improved, whereby handleability during membrane production tends to be satisfactory and reducing membrane thickness tends to be easier. The range of $N_A$ is preferably 20/µm$^2$ to 90/µm$^2$, and even more preferably 30/m$^2$ to 70/µm$^2$. When $N_B$ is 20/µm$^2$ or greater, the dynamic friction coefficient is not excessively decreased, slip phenomenon and unsatisfactory winding can be suppressed, and satisfactory adhesion to the coating layer is obtained. In addition, lithium-ion permeability tends to be improved. When $N_B$ is 200/µm$^2$ or less, the dynamic friction coefficient is not excessively increased and micro-short circuit is suppressed. The range of $N_B$ is preferably 30/m$^2$ to 150/µm$^2$, and even more preferably 40/m$^2$ to 100/µm$^2$. When $N_A/N_B$ is 0.2 or greater, satisfactory adhesion is obtained. When $N_A/N_B$ is 0.98 or less, micro-short circuit tends to be suppressed. The range of $N_A/N_B$ is more preferably 0.2 to 0.96, even more preferably greater than 0.2 and 0.90 or less, still more preferably 0.3 to 0.90, particularly preferably 0.3 to 0.85, and particularly preferably 0.5 to 0.8. When $N_A/N_B$ are in these ranges, the friction coefficients of the surfaces A and B are easily adjusted to the preferable ranges of the present disclosure.

When $S_A$ is the sum of pore areas on the surface A of 1 µm$^2$ (1 square micron) and $S_B$ is the sum of pore areas on the surface B of 1 µm$^2$, it is preferable that $S_A$ be 0.02 µm$^2$ to 0.5 µm$^2$, $S_B$ be 0.01 µm$^2$ to 0.3 µm$^2$, and $S_A/S_B$ be 1.1 to 10. Hereinafter, a structure in which the physical properties of the microporous membrane, for example, number of pores per unit area and pore area, change in the thickness direction of the microporous membrane is referred to as a "gradient structure" in the specification of the present application.

When $S_A$ is 0.02 µm$^2$ or more, the dynamic friction coefficient is not excessively increased, and lithium-ion permeability tends to be improved. When $S_A$ is 0.5 µm$^2$ or less, micro-short circuit is suppressed and membrane strength is improved, whereby handleability during membrane production tends to be satisfactory and reduction of membrane thickness tends to be easily achieved. The range of $S_A$ is preferably 0.03 µm$^2$ to 0.3 µm$^2$, and even more preferably 0.05 µm$^2$ to 0.2 µm$^2$. When $S_B$ is 0.01 µm$^2$ or more, lithium-ion permeability is improved. When $S_B$ is 0.3 µm$^2$ or less, the dynamic friction coefficient is not excessively reduced, which tends to lead to suppression of slip phenomenon, improvement of transportability, and suppression of micro-short circuit. The range of $S_B$ is preferably 0.02 µm$^2$ to 0.2 µm$^2$, and even more preferably 0.03 µm$^2$ to 0.15 µm$^2$. When $S_A/S_B$ is in the range of 1.1 to 10, improvement of the winding core removability described above, reduction of the slip phenomenon, transportability, and adhesion of the coating layer are easily achieved and ion permeability is also improved. $S_A/S_B$ is preferably in the range of 1.5 to 5, and even more preferably in the range of 1.6 to 3.

The present inventors have discovered that separators having the preferable ranges for $F_A$ and $F_B$ are easily obtained when the pore areas ($S_A$ and $S_B$) and the numbers ($N_A$ and $N_B$) of pores on the surfaces A and B are in the above ranges. In terms of usage of the microporous membrane, the surface A having a relatively large pore area has a low dynamic friction coefficient and when in contact with a winding core during the production of a wound lithium-ion secondary cell, winding core removability is satisfactory. Since the surface B having a large number of small-diameter pores has a high dynamic friction coefficient, slip phenomenon can be reduced. Further, good contact with the electrodes is obtained, where satisfactory contact with the electrodes is exhibited particularly in large square-type and pouch-type cells. In coating-type separators, when a coating layer is applied to the surface B, the adhesion of the coating layer is satisfactory.

For the microporous membrane which has a plurality of protrusions on the surface B, it is preferable that the number ($W_B$) of protrusions per 100 µm$^2$ of the surface B be in the range of 0.2/100 µm$^2$ to 1000/100 µm$^2$. When $W_B$ is in this range, the dynamic friction coefficient $F_B$ of the surface B is easily set in the preferable range. $W_B$ is more preferably in the range of 0.3/100 µm$^2$ to 100/100 µm$^2$, even more preferably in the range of 0.3/100 µm$^2$ to 50/100 µm$^2$, and still more preferably in the range of 0.5/100 µm$^2$ to 15/100 µm$^2$. When $W_B$ is 0.2/100 µm$^2$ or greater, the dynamic friction coefficient is moderately increased, slip phenomenon is reduced, and adhesive strength between the coating layer and the microporous membrane is improved. By having a $W_B$ of 1000/100 µm$^2$ or less, the dynamic friction coefficient is moderately decreased and handleability is improved.

The microporous membrane may have a plurality of protrusions on the surface A. The number ($W_A$) of protrusions per 100 µm$^2$ of the surface A is preferably less than 0.2/100 µm$^2$, and more preferably 0/100 µm$^2$. The relation between $W_A$ and $W_B$ is preferably $W_B > 10 \times W_A$, and even more preferably $W_B > 20 \times W_A$. By having a $W_A$ of 0.2 µm or less, the dynamic friction coefficient of the surface A can be reduced.

The size of the protrusions on the surface B is preferably 0.01 µm to 5 µm when the surface B is observed from the front face. A method for measuring the size of the protrusions will be described in the Examples. The size of the protrusions on the surface B has a range particularly preferable for controlling the friction coefficient of the surface B. Specifically, by having protrusions of 5 µm or less, the dynamic friction coefficient is easily kept low. In the case of a coating-type separator, satisfactory adhesive strength between the coating layer and the microporous membrane is obtained. When the microporous membrane is used as a separator for cells, the micropores of the microporous membrane are more difficult to block and ion permeability is improved. By having the size of the protrusions on the surface B at 0.01 µm or more, the dynamic friction coefficient of the surface B is moderately increased and handleability is improved. The range of the size of the protrusions on the surface B is preferably 0.02 µm to 1 µm, even more preferably 0.03 µm to 0.5 µm, and most preferably 0.1 µm to 0.5 µm. An example of the protrusions on the surface B is shown in FIG. 1(b).

It is preferable that the protrusions on the surface B be composed of polyethylene or polypropylene as a main component. These resins are already widely used as starting materials for separators in cells. Note that, "comprising as a main component" for a specific component refers to comprising the component at a ratio of more than 50 wt % based on the total weight of all components. Examples of methods of forming protrusions on the surface B include a method comprising a step of forming a microporous membrane having a surface A and a surface B opposite to the surface A; and a step of attaching protrusions containing polyethylene or polypropylene having a fiber diameter of 1 μm to 10 μm as a main component on the surface B of the microporous membrane. In this method, the above fibers or fragments obtained by cutting the fibers short become the protrusions. Examples of other methods of forming protrusions on the surface B include a production method consisting of a coextrusion step of forming a microporous original membrane comprising a target layer having a surface A and a surface B opposite to the surface A and a supplementary layer on the surface B of the target layer by coextrusion of the target layer and the supplementary layer; and the following (a) to (c) after the coextrusion step: (a) a stretching step of stretching the microporous original membrane; (b) an extraction step of extracting a plasticizer from the microporous original membrane in the presence of an extraction solvent; and a peeling step of peeling the supplementary layer from the surface B of the target layer to obtain the target layer as a microporous membrane. In this method, the protrusions are, for example, fibril portions pulled out from the surface of the microporous membrane, and protrusions having a small size are obtained. Any of these methods may be used. For more details, refer to the description in the section "Production method of microporous membrane".

In a cross-section of the microporous membrane, when a ratio (%) of the number of pores having a pore size of 0.12 μm or more to a total number of pores observed in a vicinity of the surface A is $NC_A(0.12)$, a ratio (%) of the number of pores having a pore size of 0.12 μm or more to a total number of pores observed in a vicinity of a center in a cross-sectional direction is $NC_M(0.12)$, and a ratio (%) of the number of pores having a pore size of 0.12 μm or more to a total number of pores observed in a vicinity of the surface B is $NC_B(0.12)$, it is preferable that $NC_A(0.12)>NC_M(0.12)>NC_B(0.12)$. Specifically, it means that the number of pores having a pore size of 0.12 μm or more is large at the surface A and decreases towards the surface B. It is more preferable that the number of pores having a pore size of 0.12 μm or more decrease monotonically from the surface A towards the surface B.

It is preferable that $NC_A(0.12)/NC_B(0.12)>1.2$. In this range, micro-short circuit preventability and ion permeability are satisfactory. When $NC_A(0.12)/NC_B(0.12)>1.5$, dendrite suppressing effect is further improved. It is also preferable that $NC_A(0.12)/NC_B(0.12)>2.0$. In this range, the dendrite suppressing effect tends to be further improved.

$NC_A(0.12)$ is preferably 2% to 5%, and more preferably 2% to 3%. $NC_B(0.12)$ is preferably 0.5% to 3.0%, and more preferably 0.5% to 2.3%, 0.5 to 1.9%, 0.6% to 3.0%, 0.6% to 2.3%, or 0.6% to 1.9%. In these ranges, the dendrite suppressing effect tends to be further improved.

In a cross-section of the microporous membrane, when a ratio (%) of the number of pores having a pore size of less than 0.1 μm to a total number of pores observed in a vicinity of the surface A is $NC_A(0.10)$, a ratio (%) of the number of pores having a pore size of less than 0.1 μm to a total number of pores observed in a vicinity of a center in a cross-sectional direction is $NC_M(0.10)$, and a ratio (%) of the number of pores having a pore size of less than 0.10 μm to a total number of pores observed in a vicinity of the surface B is $NC_B(0.10)$, it is preferable that $NC_A(0.10)<NC_M(0.10)<NC_B(0.10)$. Specifically, it means that the number of pores having a pore size of less than 0.1 μm increases from the surface A towards the surface B. It is more preferable that the number of pores having a pore size of less than 0.1 μm decrease monotonically from the surface A towards the surface B. In this range, the dendrite suppressing effect tends to be further improved.

It is more preferable that $NC_A(0.12)>NC_M(0.12)>NC_B(0.12)$ and $NC_A(0.10)<NC_M(0.10)<NC_B(0.10)$ for the microporous membrane. Specifically, it means that the number of pores having a relatively large pore size of 0.12 μm or more is large at the surface A and decreases towards the surface B, and the number of pores having a relatively small pore size of less than 0.1 μm increases from the surface A towards the surface B. Consequently, the dendrite suppressing effect tends to be further improved.

Of the pores observed on the surface of the microporous membrane, when the average pore size of the pores on the surface A is $\Phi_A$ and the average pore size of the pores on the surface B is $\Phi_B$, it is preferable that $\Phi_A>\Phi_B$. Specifically, it means that the pore size increases from the surface B towards the surface A as the number of pores having a small diameter decreases from the surface B towards the surface A in the thickness direction. In a membrane having such a pore structure, for example, when dendrites grow from the surface A towards the surface B inside the film, since the pore size gradually becomes smaller, rectilinearity is impaired and it is difficult to penetrate the separator. Conversely, when dendrites grow from the surface B, it is difficult to infiltrate the interior of the separator from the surface B.

From the viewpoint of inhibiting the growth of dendrites, of the pores observed in the cross-section of the microporous membrane, when the average pore size (diameter) of pores on the surface B is $\Phi_B$, $\Phi_B$ is adjusted to a size as small as possible, in the range of preferably 5 nm to 100 nm, more preferably 10 nm to 80 nm, and even more preferably 20 nm to 70 nm. It is preferable that the microporous membrane of the present disclosure have a gradient structure, wherein the number of pores, the pore area, and the pore size are closely related to each other, for example, when the number of pores having a small diameter increases from the surface A towards the surface B, the average pore area basically decreases and the average pore size also decreases.

The technical significance of the gradient structure will be described below. The microporous membrane obtained by a wet method and/or a dry method is used as a separator for lithium-ion cells. In the case of a separator application, there is a problem that a micro-short circuit easily occurs when a cell is repeatedly charged and discharged. One of the causes includes a phenomenon in which dendritic metallic lithium (lithium dendrite) is deposited on the surface of the negative electrode. When charging and discharging are further repeated, lithium dendrites grow towards the positive electrode, breaks through the separator, and partially causes an internal short circuit.

Particularly in recent years, the direction of development in lithium-ion cells is to improve the permeability in order to increase the output, and methods of increasing pore size of a microporous membrane or improving porosity are adopted for this purpose. In addition, due to the miniaturization of cells, the thickness of a separator tends to be thin. The direction of development of improving permeability or reducing membrane thickness was a trade-off relationship with the prevention of internal short circuit described above. To solve this problem, PTL 8 discloses a separator having a porous structure of two or more layers, one of which is a layer that does not react with dendrites. PTL 7 discloses a separator having a multilayer structure of two or more layers, wherein one layer has a small pore size and the other has a large pore size. PTL 6 does not describe dendrites, but describes a separator for lithium-ion secondary cells having a two-layer structure made from a wet method, wherein the pore sizes of the two layers are different and have a specific ratio. However, none of the techniques described in PTL 6 to 8 could sufficiently achieve the improvement of permeability and the prevention of dendrites. The separators or microporous membranes described in these patent literature were all composed of a multilayer structure of two layers and had a problem with peeling at the interface. In the case of multilayer lamination, the thickness could not be reduced. In the case of multilayer coextrusion, since the layers were different, there was a problem that the membrane ruptured during co-stretching, high-ratio stretching could not be carried out, and high strength increase was difficult.

PTL 9 discloses a polyethylene microporous membrane composed of a polyethylene-based resin, wherein the polyethylene microporous membrane is a single membrane having a dense structural region having an average pore size of 0.01 μm to 0.05 μm and a course structural region having an average pore size at 1.2 times to 5.0 times of that of the dense structural region, adjacent in the thickness direction, and wherein the coarse structural region is formed on at least one surface of the membrane, and describes that the microporous membrane is obtained by a method in which a melt-kneaded product with a membrane-forming solvent is extruded from a die, the extrusion-molded body obtained through the extruder and die is cooled by a single-sided cast roll so as to generate a temperature distribution in the thickness direction to form a gel-like sheet. PTL 9 describes that a membrane having a pore size distribution in the thickness direction can be obtained in such a manner. However, making the microporous membrane obtained by this method thin was difficult. Recently, for consumer use, the thickness of separators is 18 μm or less, most are 10 μm or less, and thin membranes of about 6 μm are mainstream. The Examples of PTL 9 only describe a relatively thick membrane of 19 μm to 23 μm, and only show a membrane in which the puncture strength, an index of the strength of the separator, is a low strength of 300 gf or less in terms of 10 μm thickness. This is because in the method described in PTL 9, when the thickness was reduced to about 18 μm or less, the temperature difference between the two surfaces of the microporous membrane was reduced, and forming a pore size distribution structure along the thickness direction was difficult. Further, in a preferred embodiment of PTL 9, cooling the surface of a membrane in contact with a cast cooling roll set to 15° C. is described. However, this method causes the surface to be excessively cooled, leading to insufficient crystallization and excessive friction, and the pin removability in a wound cell deteriorates. Furthermore, PTL 9 hypothesizes that the microporous membrane comprises 1 to 15 wt % of a high molecular weight component having a molecular weight of 1,000,000 or greater, and if the content is exceeded, a coarse structure cannot be formed.

Recently, separators comprising an inorganic (e.g., alumina or silica) filler coating layer or an organic coating layer such as latex or an aramid resin on a polyolefin separator (hereinafter, may be referred to as "coating base material") are increasing in numbers mainly for in-vehicle applications. This coating layer has become widespread, from the viewpoint of prevention of heat shrinkage due to an inorganic filler layer and prevention of membrane rupture at high temperatures, or for the purpose of improving cell performance by improving contact of an organic coating layer to an electrode. Further, in in-vehicle applications, the reduction of membrane thickness of a separator is required due to the demand for miniaturization of a cell itself. Since these coating layers have a thickness of 2 μm to 6 μm, it is necessary for the coating base material to be thinner. However, the separators described in PTL 6 to 9 could not satisfy both the reduction of membrane thickness and the improvement of battery performance such as electrode degradation prevention. In this regard, by having a gradient structure in a microporous membrane, a microporous membrane that satisfies both the reduction of membrane thickness and the improvement of battery performance such as electrode degradation prevention can be obtained. Without limiting to theory, the reason therefor is considered as follows. Specifically, lithium dendrites grow as charging and discharging are repeated. Lithium dendrites grow from the negative electrode side during charging and discharging, and migrate into the interior from the separator surface. At this time, by arranging the surface A having a relatively large pore area facing the negative electrode and the surface B having a relatively large number of pores having a small diameter facing the positive electrode, the pore area facing the growth direction of the lithium dendrites decreases and the number of pores having a small diameter increases, whereby it is considered that the growth rate of lithium dendrites can be reduced. Therefore, a microporous membrane in which the pore structure changes gradually in the thickness direction has a more superior effect of preventing impurities and lithium dendrites from penetrating the separator and tends to have higher electrode degradation preventability than a microporous membrane in which only the pore structure on the surface varies or a microporous membrane in which the pore structure changes sharply. This effect is relevant to the pore areas and the numbers of pores on both surfaces.

It is preferable that the thickness of the microporous membrane be in the range of 3 μm to 18 μm. When the thickness is 3 μm or more, mechanical strength is increased, and problems such as rupturing in the production steps can be suppressed. When the thickness is 18 μm or less, cells comprising the microporous membrane can be made thin. From the viewpoint of balancing mechanical strength, productivity, and cell thickness, the thickness of the microporous membrane is more preferably 3 μm to 12 μm, even more preferably 3 μm to 10 μm, and still more preferably 3 μm to 8 μm.

Regarding the puncture strength of the microporous membrane, it is preferable that the puncture strength be 300 gf/10 μm or more in terms of 10 μm thickness of the microporous membrane. Setting the puncture strength "in terms of 10 μm thickness of the microporous membrane" means that, for example, when the puncture strength of a 15 microporous membrane is observed to be 600 gf, the puncture strength in terms of 10 μm is calculated as 600 gf×10 μm/15 μm=400 gf/10 μm. Particularly in recent years, there has been a demand for thin microporous membranes having a thickness of 4 μm to 6 μm, and it is expected that the trend in the reduction of membrane thickness will not change in the future. Further, in thin membranes having a thickness of 5 μm to 6 μm, since strength during cell production steps such as winding is also necessary, absolute strength is required. The puncture strength in these thin membranes having a thickness of 4 μm to 6 μm is preferably 350 gf/10 μm or more, more preferably 400 gf/10 μm or more, and even more preferably 500 gf/10 μm or more, with the upper limit preferably in the range of 1200 gf/10 μm or less. When the puncture strength is 1200 gf/10 μm or less, over-stretching is prevented and dimensional stability of the target layer can be improved. Note that, in the production method of the microporous membrane described later, it is possible for the puncture strength of the microporous membrane to be controlled in the above numerical ranges.

It is preferable that the porosity of the microporous membrane be 20% to 75%. The upper limit of the porosity is arbitrarily set from the viewpoint of suppressing the reduction in mechanical strength and the deterioration in heat shrinkability. The lower limit thereof is arbitrarily set from the viewpoint of lithium-ion permeability, i.e., cell performance, and from the viewpoint of suppressing micro-short circuit. The porosity of the microporous membrane is preferably 30% to 60%, and more preferably 35% to 55%.

Regarding the air permeability of the microporous membrane, it is preferable that the air permeability be 30 sec/100 ml/10 µm to 1000 sec/100 ml/10 µm in terms of 10 µm thickness of the microporous membrane. The air permeability "in terms of 10 µm thickness of the microporous membrane" is the same as calculating the puncture strength in terms of the previously described 10 µm thickness. The lower limit of the air permeability is defined from the viewpoint of suppressing the reduction of mechanical strength and the deterioration of heat shrinkage. The upper limit is defined by lithium-ion permeability, i.e., cell performance, as well as the suppression of micro-short circuit. These viewpoints are substantially the same as in the case of the preferably defined porosity. The air permeability in terms of 10 µm thickness of the microporous membrane is more preferably 50 sec/100 ml/10 µm to 500 sec/100 ml/10 µm, and even more preferably 90 sec/100 ml/10 µm to 400 sec/100 ml/10 µm.

It is preferable that the surface A and the surface B of the microporous membrane contain polyethylene as a main component. Polyethylenes such as high-density polyethylene, linear low-density polyethylene, and low-density polyethylene are used. Preferably, from the viewpoint of strength, the polyethylene is a high-density polyethylene having a high molecular weight and high density. The polyethylene preferably contains 5 wt % to 30 wt % of a component having a viscosity-average molecular weight of 2,000,000 or greater. The polyethylene is preferably an ultra-high molecular weight polyethylene having a viscosity-average molecular weight of 500,000 to 900,000. The polyethylene contains preferably 10 wt % or more, preferably 10 wt % to 97 wt %, and more preferably 20 wt % to 95 wt % of an ultra-high molecular weight polyethylene based on the total weight of the polyethylene. An additional polymer such as polypropylene or a propylene-based elastomer may be contained in a range that does not impair the characteristics of the membrane as a separator. It is also preferable that the surface A and the surface B of the microporous membrane contain 20 wt % or more of an ultra-high molecular weight component having a viscosity-average molecular weight of 1,000,000 or greater, based on the total mass of all polymers forming the microporous membrane. The polyethylene preferably has a viscosity-average molecular weight of 200,000 or greater as a total.

<<Coating Layer>>

The microporous membrane may further comprise a coating layer containing an inorganic filler or an organic coating material, from the viewpoint of further improving shrinkage characteristic. The coating layer is preferably an inorganic filler layer containing an inorganic filler. The microporous membrane may comprise the coating layer on either the surface A or the surface B. However, it is preferable that the surface B, which has a higher dynamic frictional resistance and a relatively smaller pore area, have the coating layer thereon compared to the surface A, from the viewpoint of adhesive strength of the coating layer and preventing the pores from clogging due to the coating material.

The coating material for forming an inorganic filler layer containing an inorganic filler can be, for example, a liquid mixture containing 1 part by weight to 30 parts by weight of a binder per 100 parts by weight of the inorganic filler and, as needed, a solvent. The same component contained in the supplementary layer described later can be used as the inorganic filler. Examples of the binder include polyolefins such as polyethylene and polypropylene; fluororesins such as polyvinylidene fluoride and polytetrafluoroethylene; fluororubbers such as vinylidene fluoride-hexafluoropropylene-tetrafluoroethylene copolymer and ethylene-tetrafluoroethylene copolymer; rubbers such as styrene-butadiene copolymer and hydrides thereof, acrylonitrile-butadiene copolymer and hydrides thereof, acrylonitrile-butadiene-styrene copolymer and hydrides thereof, methacrylic acid ester-acrylic acid ester copolymer, styrene-acrylic acid ester copolymer, acrylonitrile-acrylic acid ester copolymer, ethylene propylene rubber, polyvinyl alcohol, and polyvinyl acetate; and resins having a melting point and/or a glass transition temperature of 180° C. or higher, such as polyphenylene ethers, polysulfones, polyethersulfones, polyphenylene sulfides, polyetherimides, polyamide-imides, polyamides, and polyesters.

<<Method for Producing Microporous Membrane>>

As one of the methods for producing the microporous membrane of the present disclosure, there includes a method of attaching protrusions to the surface B of the microporous membrane. For example, protrusions containing polyethylene or polypropylene having a fiber diameter of 1 µm to 10 µm as a main component may be attached to the surface B of a microporous membrane produced by a wet method. By attaching protrusions to the surface B of the microporous membrane, the ratio ($F_B/F_A$) of the dynamic friction coefficient ($F_B$) of the surface B to the dynamic friction coefficient ($F_A$) of the surface A is easily set to the range of 1.2 to 20. Note that, the fiber diameter should be measured on a SEM photograph.

More specifically, examples of methods for producing a microporous membrane include a method in which nonwoven fibers having a diameter of about 1 µm to 3 µm obtained by cutting and pulverized a nonwoven fabric made by an arbitrary method such as melt-blown method or spunbond method are attached to the surface B of a pre-produced microporous membrane in a predetermined amount and subsequently heat-bonded in the range of a temperature 50° C. lower than the melting point of the nonwoven fabric or higher and lower than the melting point of the nonwoven fabric. The predetermined amount is an amount in which the number ($W_B$) of protrusions formed by the nonwoven fibers is, for example, 0.2/100 µm² to 1000/100 µm². More specifically, when a nonwoven fiber made of isotactic polypropylene and having a diameter of about 2 µm is attached to a microporous membrane of high-density polyethylene, the heat-bonding temperature is in the range of preferably 100° C. to 150° C., and more preferably 120° C. to 135° C. The heat-bonding temperature is affected by bonding pressure and bonding time. However, considering that the pore structure of a microporous membrane may be deformed due to heat and micropores may be blocked by the adhered nonwoven fabric, resulting in deterioration of permeability, a person skilled in the art can select conditions, specifically temperature and pressure, in ranges in which the primary object as a separator can be achieved.

Examples of other methods for producing a microporous membrane include a method which comprises a coextrusion step of coextruding a target layer (which becomes the microporous membrane) and a supplementary layer than can be peeled off from the target layer and laminating the target layer and the supplementary layer together to obtain a microporous original membrane; a stretching step of stretching the microporous original membrane after the coextrusion step; an extraction step of extracting and removing a plasticizer from the microporous original membrane; and a peeling step of peeling a peeling layer from the target layer in any order. More specifically, the method for producing a microporous membrane comprises the following: a coextrusion step of coextruding a target layer having a surface A and a surface B opposite thereto and containing a plasticizer and a supplementary layer containing a plasticizer, whereby a microporous original membrane comprising the target layer and the supplementary layer on the surface B of the target layer is formed. After the coextrusion step, the method may comprise the following (a) to (c): (a) a stretching step of stretching the microporous original membrane, (b) an extraction step of extracting the plasticizers from the microporous original membrane in the presence of an extraction solvent, and (c) a peeling step of peeling the supplementary layer from the surface B of the target layer to obtain the target layer as a microporous membrane, in any order. The target layer preferably contains 40 wt % or more of a plasticizer based on the total weight of the target layer. The supplementary layer preferably contains 60 wt % or less of a plasticizer based on the total weight of the supplementary layer. The method may further comprise a step of re-stretching the microporous original membrane at a predetermined temperature. The target layer is a layer that becomes the microporous membrane of the present disclosure, and the supplementary layer is a layer used for membrane production and removed from the target layer in the peeling step. The target layer may be of a single layer.

By using the above method for producing a microporous membrane, the present inventors have discovered that protrusions can be easily generated on the surface B and the ratio ($F_B/F_A$) of the dynamic friction coefficient ($F_B$) of the surface B to the dynamic friction coefficient ($F_A$) of the surface A is easily set to the range of 1.2 to 20. The reason therefor is considered that fibrils on the microporous membrane layer surface already generated are pulled in the peeling direction in a state of being partially fused to the supplementary layer by the peeling step, and thus the fibrils of the microporous layer or/and of the supplementary layer are fixed on the surface B in a pulled-out state to form protrusions. Since the number $W_B$ of protrusions on the surface B is greatly affected by the degree of fusion in the re-stretching step before peeling in the peeling step, it is important to consider the melting point of the resin relative to the temperature in the re-stretching step described above. For example, when a resin composition mainly composed of high-density polyethylene is used for the microporous layer and a resin composition mainly composed of isotactic polypropylene is used for the supplementary layer, the re-stretching temperature is preferably in the range of 110° C. to 140° C., and more preferably in the range of 120° C. to 135° C.

The peeling step, the stretching step, and the extraction step described above may be carried out in any order as long as these steps are carried out after the above extrusion step. The method for producing a microporous membrane preferably comprises an extrusion step, and subsequently (a) a stretching step, (b) an extraction step, and (c) a peeling step in this order. The method for producing a microporous membrane, when further comprising a re-stretching step, more preferably comprises an extrusion step, and subsequently (a) a stretching step, (b) an extraction step, a re-stretching step, and (c) a peeling step in this order.

The microporous original membrane obtained from the coextrusion step is also referred to as a precursor of a microporous membrane laminate, a coextruded original membrane, an original membrane before stretching, an original membrane before co-stretching, a precursor sheet, or a resin original membrane. The layer structure of the microporous original membrane during coextrusion is not limited as long as it has two or more layers including the target layer. For example, if the microporous original membrane has a three-layer structure, the three-layer structure has target layer/supplementary layer/target layer, wherein the supplementary layer side of each of the two target layers corresponds to the surface B, and the other side corresponds to the surface A. In this case, since two target layers can be obtained in one extrusion step, the productivity per membrane production equipment is significantly increased. The target layer and the supplementary layer used in the method for producing a microporous membrane and each step thereof will be further described below.

<Target Layer>

From the viewpoint of mold processability and solvent resistance to electrolyte solution, and from the viewpoint of low-temperature shutdown characteristic, it is preferable that the starting material of the target layer have a polyolefin as a main component. The low-temperature shutdown characteristic is a safety function that occludes the pores of a separator when overheating near the melting point of the resin and cuts off the current, even during a thermal runaway of a cell, and is activated near the melting point of the starting resin. Examples of the polyolefin include polyethylene and polypropylene.

Examples of the polyethylene include high-density polyethylene, ultra-high molecular weight polyethylene, linear low-density polyethylene, high-pressure low-density polyethylene, and mixtures thereof. When the microporous membrane is used as a separator, linear high-density polyethylene by ion polymerization, ultra-high molecular weight polyethylene, and a mixture thereof is preferable from the viewpoint of ability to reduce high shrinkage. In the specification of the present application, ultra-high molecular weight polyethylene refers to a polyethylene having a viscosity-average molecular weight of 500,000 or greater. The proportion of ultra-high molecular weight polyethylene in the total amount of polyethylene is preferably 5 wt % to 97 wt %, more preferably 10 wt % to 97 wt %, and from the viewpoint of dispersibility, even more preferably 20 wt % to 95 wt %.

The viscosity-average molecular weight (Mv) of the polyethylene is preferably 200,000 or greater, more preferably 300,000 or greater, and even more preferably 500,000 or greater, from the viewpoint of improving the strength of the microporous membrane. When a plurality of polyethylenes are used, viscosity-average molecular weight (Mv) means the total viscosity-average molecular weight thereof.

The molecular weight distribution (Mw/Mn) of the polyethylene, when mixed and kneaded with inorganic particles, is preferably 6 or greater, and more preferably 8 or greater, from the viewpoint of improving the kneadability of the mixture and suppressing the occurrence of granular defects in which the inorganic particles undergo secondary aggregation.

Examples of the polypropylene include homopolymers of propylene such as isotactic polypropylene, syndiotactic polypropylene, and atactic polypropylene; and random copolymers, block copolymers, and terpolymers obtained by copolymerizing propylene with comonomers of ethylene or butene and α-olefins having 5 or more carbon atoms. Further, polypropylene having reduced stereoregularity may be blended with a starting resin of the target layer in a small amount, preferably 10 wt % or less, using a metallocene catalyst. Among the polypropylene described above, isotactic polypropylene is preferable from the viewpoint of balance between moldability and physical properties such as strength and rigidity.

The viscosity-average molecular weight (Mv) of the polypropylene is preferably 1,200,000 or less, more preferably 900,000 or less, and even more preferably 800,000 or less, from the viewpoint of facilitating melt-kneading and improving fisheye defects when the polypropylene is used as a microporous membrane.

From the viewpoint of extrusion moldability of the microporous original membrane and lowering the shutdown temperature when used as a separator for lithium-ion secondary cells, it is preferable that the starting resin of the target layer contain polyethylene, which generally has a lower melting point than polypropylene, as a main component. The formed microporous membrane may contain polyethylene as a main component. The content of the polyethylene in the microporous membrane based on the total weight of non-volatile components of the microporous membrane is preferably 60 wt % or more, more preferably 85 wt % or more, and even more preferably 92 wt % or more, from the viewpoint of extrusion moldability and shutdown temperature. Further, the content may be 100 wt % or less, 99 wt % or less, or 98 wt % or less. The polyethylene in the microporous membrane contains an ultra-high molecular weight polyethylene having a viscosity-average molecular weight of 500,000 to 900,000 in an amount of preferably 10 wt % or more, more preferably 10 wt % to 97 wt %, and even more preferably 20 wt % to 90 wt %, 20 wt % to 80 wt %, or 20 wt % to 70 wt % based on the total weight of polyethylene, from the viewpoint of obtaining a balance of strength, permeability, and dynamic friction coefficient of the microporous membrane. Further, the microporous membrane contains an ultra-high molecular weight component having a viscosity-average molecular weight of 1,000,000 or greater, for example, an ultra-high molecular weight polyethylene having a viscosity-average molecular weight of 1,000,000 or greater in an amount of preferably 20 wt % or more, more preferably 20 wt % to 80 wt %, and even more preferably 30 wt % to 70 wt %, from the viewpoint of strength.

<Supplementary Layer>

The method for producing a microporous membrane may comprise a step of providing at least one supplementary layer adjacent the microporous membrane (target layer) described above.

By choosing an appropriate composition, the supplementary layer serves a function of controlling the $N_A$, $N_B$, and $N_A/N_B$ to the optimal ranges for the numbers $N_A$ and $N_B$ of pores per 1 µm² (1 square micron) of the respective surface A and surface B of the target layer in the production process of the microporous membrane. The same applies to controlling $S_A$, $S_B$, $NC_A$, $NC_B$, and $NC_M$.

The supplementary layer serves a function of a stretched supplementary layer when stretching a coextruded microporous original membrane. Specifically, even when the target layer is as thin as about 3 µm to 6 µm, which is difficult to achieve when only the target layer is stretched, such a thin target layer can be easily produced by a method using a supplementary layer. For example, when producing a target layer having a thickness of 4 µm, if the supplementary layer is adjusted to a thickness of 4 µm and a three-layer coextruded original membrane of target layer/supplementary layer/target layer is used, since the total thickness of the layers is 12 µm, high-ratio stretching is easily achieved. In addition, if a composition which can be stretched at a lower temperature than the optimal stretching temperature of the target layer is selected as the composition of the supplementary layer, a high degree of orientation can be applied to the target layer, and the strength of the target layer can be increased.

The starting material of the supplementary layer may be selected in consideration of not the co-extrudability and co-stretchability but also the peelability with the microporous membrane that is the target layer. As the starting material of the supplementary layer, for example, polyolefins such as polyethylene and polypropylene; and polyamides, polyesters, and polyvinylidene fluoride are suitably used. Basically, the peel strength with the microporous membrane or the strength during peeling can be used as an index for selecting the starting material of the supplementary layer. For example, when a high-density polyethylene having a melting point of 135° C. is used as a starting material of the microporous membrane (target layer), it is preferable that a resin having a higher melting point than polyethylene, such as polypropylene and polyethylene terephthalate (PET), be selected as a starting material of the supplementary layer. Particularly, when using polypropylene as a starting resin of the supplementary layer, since co-extrudability and co-stretchability with the microporous membrane containing polyethylene as a main component are improved, a microporous membrane having superior membrane thickness distribution can be preferably obtained. Further, when a polypropylene having a melting point of 150° C. or lower, for example, a random copolymer or a polypropylene having low stereoregularity is used as a starting resin of the supplementary layer, since the stretchability is further improved, not only the membrane thickness distribution but also a balance of permeability and strength of the obtained microporous membrane is improved. For example, by mixing a random copolymer elastomer of two or three comonomers of polybutene-1, petroleum resin, ethylene, propylene, and 1-butene or styrene-butadiene rubber as a stretching aid with the resin material of the supplementary layer, the strength of the supplementary layer itself is also improved, and the thickness of the supplementary layer can be reduced. Examples of the stretching aid include elastomers having a melting point of 130° C. or higher, more preferably 140° C. or higher, and most preferably 150° C. or higher to prevent heat fusion between the target layer and the supplementary layer in the heat treatment step. Examples of the starting resin of the supplementary layer include homopolypropylene having a melting point of 160° C. or higher. In this case, the stretching aid is appropriately mixed with the starting resin, whereby stretchability is improved.

It is preferable that the supplementary layer contain an inorganic filler to improve peelability. Examples of the inorganic filler include oxide-based ceramics such as alumina (for example, α-alumina), silica, titania, zirconia, magnesia, ceria, yttria, zinc oxide, and iron oxide; nitride-based ceramics such as silicon nitride, titanium nitride, and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomite, and quartz sand; and glass fiber. These inorganic fillers may be used alone or as a mixture of a plurality thereof. Of these, silica, alumina, calcium carbonate, talc, and zinc oxide are particularly preferable.

The particle size of the inorganic filler is preferably in the range of 0.05 μm to 10 μm. When the particle size of the inorganic filler is in this range, the inorganic filler reinforces the resin membrane and improves the strength of the supplementary layer itself. Thus, the supplementary layer is difficult to rupture during the peeling step and can be stably produced. The particle size of the inorganic filler is in the range of more preferably 0.05 μm to 8 μm, even more preferably 0.1 μm to 8 μm, and still more preferably 0.1 μm to 5 μm. In these ranges, the strength of the supplementary layer is increased, the peeling rate is increased, and the productivity can be improved.

It is preferable that when the resin component contained in the supplementary layer is 100 parts by weight, the content of the inorganic filler be 5 parts by weight to 300 parts by weight since the peelability tends to be improved. The content of the inorganic filler is more preferably 5 parts by weight to 100 parts by weight based on 100 parts by weight of the resin component of the supplementary layer. In this numerical range, the strength of the supplementary layer itself is increased, And the supplementary layer can be peeled at a high rate without rupturing during peeling. The content of the inorganic filler is even more preferably 8 parts by weight to 50 parts by weight based on 100 parts by weight of the resin content of the supplementary layer. In this numerical range, the peeling rate can be further increased.

When peeling the target layer from the microporous original membrane or separating the target layer and the supplementary layer, it is preferable that the peel strengths of the microporous membrane, which is the target layer, and the adjacent supplementary layer be 250 gf/25 mm width or less in a peeling rate of 100 mm/min. To achieve this peel strength, it is preferable that at least one supplementary layer separated from the microporous membrane of the target layer be a microporous membrane or a poreless membrane having an air permeability of 3000 sec/100 ml or more. Here, "poreless membrane" is not strictly defined, and refers to a membrane having an air permeability that exceeds about 10000 sec/100 ml in the specification of the present application.

The present inventors have discovered that when the air permeability of the supplementary layer is 3000 sec/100 ml or more, the preferable conditions of the dynamic friction coefficients $F_A$ and $F_B$ of the surfaces A and B are satisfied, and/or the preferable gradient structure is easily formed in the target layer. Without being bound by theory, the present inventors speculate the following regarding the reason for this phenomenon. Specifically, to set the air permeability of the target layer low while setting the air permeability of the supplementary layer relatively high, the amount of plasticizer mixed in the target layer is 40 wt % or more based on the total weight of the target layer and the amount of plasticizer mixed in the supplementary layer is 60 wt % or less based on the total weight of the supplementary layer during coextrusion. Preferably, the amount of plasticizer mixed in the target layer is greater than the amount of plasticizer mixed in the supplementary layer. Consequently, the plasticizer is partially transferred from the vicinity of the surface B of the target layer to the supplementary layer at the interface where the surface B of the target layer and the supplementary layer are in contact inside the die during coextrusion. By reducing the number of pores having a large pore size and the pore area near the surface B of the target layer, $S_B$ decreases with respect to $S_A$, and the number of pores having a small pore size near the surface B of the target layer increases. When the number of pores having a large pore size on the surface B decreases, the contact area is increased, and the dynamic friction coefficient of the surface B is increased as compared to that of the surface A. As a result, presumably a structure satisfying the preferable conditions of the dynamic friction coefficients $F_A$ and $F_B$ of the surfaces A and B is easily formed in the target layer. Since the plasticizer is also transferred from the vicinity of the surface B towards the surface A, the pore size and the pore area of large pores near the surface A relatively increase. As a result, the number $NC_A$ of pores having a large pore size also increases, whereby presumably, a gradient structure in which the number of pores having a large pore size decreases from the surface A towards the surface B, the number of pores having a small pore size increases from the surface A towards the surface B, and the pore area and the average pore size decrease from the surface A towards the surface B. This phenomenon can be adjusted by extrusion conditions, such as the amount of plasticizer, temperature, and pressure, and structure of the die. Further, the phenomenon can also be adjusted by the composition of the supplementary layer in the production method of the present embodiment.

It is preferable that the supplementary layer have a puncture strength of 40 gf or more. When the puncture strength of the supplementary layer is 40 gf or more, the membrane can be satisfactorily peeled without rupturing during the peeling step. The puncture strength of the supplementary layer is more preferably 80 gf or more from the viewpoint of peelability of a membrane having a relatively large width, and more preferably 120 gf or more from the viewpoint of high-rate peelability. The puncture strength of the supplementary layer is most preferably 200 gf or more. At 200 gf or more, peeling and productivity are further stabilized.

<Components Other than Resin>

The target layer and the supplementary layer each contain a plasticizer. Examples of the plasticizer include liquid paraffin, DBP: dibutyl isophthalate, DOP: dioctyl isophthalate, DIDP: diisodecyl isophthalate, and DTDP: ditetradecyl isophthalate. The target layer contains a plasticizer in an amount of 40 wt % or more, and the supplementary layer contains a plasticizer in an amount of 60 wt % or less.

Since the plasticizer is involved in the permeation performance of the microporous membrane and, in the case of a separator for lithium-ion secondary cells, the output and cycle performance of a cell, the content of the plasticizer in the microporous membrane layer (target layer) in the extrusion step is 40 wt % or more, preferably 50 wt % or more, and even more preferably 60 wt % or more. In order to increase membrane strength or, in the case of a separator for lithium-ion secondary cells, to prevent the excessive increase in permeability, and to suppress micro-short circuit, the content of the plasticizer in the target layer is preferably 90 wt % or less. It is preferable that the content of a plasticizer in the target layer be greater than the content of a plasticizer in the supplementary layer.

The content of the plasticizer in the supplementary layer in the extrusion step is 60 wt % or less, preferably 40 wt % or less, more preferably 30 wt % or less, and even more preferably 20 wt % or less. When the amount of plasticizer in the supplementary layer is more than 60 wt %, the gradient structure according to the present embodiment is difficult to obtain. In addition, the strength of the supplementary layer membrane is weakened, whereby the membrane easily ruptures during the peeling step. The content of the plasticizer in the supplementary layer is preferably more than 0 wt %, for example, 0.1 wt % or more, 0.5 wt % or more, 1 wt % or more, 3 wt % or more, or 5 wt % or more.

The target layer and the supplementary layer may each contain an antioxidant. Examples of the antioxidant include phenol-based antioxidants such as "Irganox 1010", "Irganox 1076", and "BHT" (all trademarked, manufactured by Ciba Specialty Chemicals); phosphorus-based or sulfur-based secondary antioxidants; and hindered amine-based weatherproofing agents. The antioxidants may be used alone or in combination of a plurality thereof.

From the viewpoint of strength, optical characteristics, and foreign matter removal characteristic of the microporous original membrane or the microporous membrane, it is preferable that the antioxidant be a combination of a phenol-based antioxidant and a phosphorus-based antioxidant. Specifically, the antioxidant is a combination of one or more phenol-based antioxidants selected from pentaerythrityl-tetrakis[3-(3,5-di-t-butyl-4-hydroxyphenyl)propionate], octadecyl-3-(3,5-di-t-butylhydroxyphenyl)propionate, and 1,3,5-trimethyl-2,4,6-tris(3,5-di-t-butylhydroxybenzyl)benzene and one or more phosphorus-based antioxidants selected from tris(2,4-di-t-butylphenyl)phosphite, tetrakis(2,4-di-t-butylphenyl)-4,4'-biphenylene phosphite, and 6-[3-(3-t-butyl-4-hydroxy-5-methylphenyl)propoxy]-2,4,8,10-tetra-t-butyldibenzo[d,f][1,3,2]dioxyphosphepin.

The addition amount of the antioxidant can be adjusted according to the application of the microporous membrane, generally in the range of 100 ppm to 1 wt % based on the mass of each layer. When a phosphorus-based antioxidant is used in combination with a phenol-based antioxidant, the mass ratio of the phenol-based/phosphorus-based antioxidants is preferably ⅓ to 3/1.

The target layer and the supplementary layer may each contain an additive for modifying the layer. Examples of the additive include antifogging materials such as glycerin esters; slip materials typified by fatty acid amides such as erucic acid, stearic acid, and oleic acid; antistatic agents; inorganic fillers such as silica and alumina; plasticizers such as liquid paraffin; lubricating oils or internal lubricants such as calcium stearate; and peeling aids such as silicone-based solid-state release agents.

Examples of the antistatic agent include amines such as alkyldiethanolamine and hydroxyalkylethanolamine; amine esters such as stearyldiethanolamine mono-fatty acid ester; alkyloamides such as lauric acid diethanolamide and stearic acid diethanolamide; mono-fatty acid esters such as glycerin and diglycerin; anionic antistatic agents such as alkylbenzenesulfonic acid; and polyoxyethylene alkyl ethers. Antistatic agents may be used alone or in combination of a plurality thereof. The blending amount of the antistatic agent is preferably 500 ppm to 10,000 ppm to the total resin solid content forming each layer.

Examples of the inorganic filler include oxide-based ceramics such as alumina (for example, α-alumina), silica, titania, zirconia, magnesia, ceria, yttria, zinc oxide, and iron oxide; nitride-based ceramics such as silicon nitride, titanium nitride, and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomite, and quartz sand; and glass fiber. These inorganic fillers may be used alone or as a mixture of a plurality thereof. The blending amount of the inorganic filler to the total resin solid content forming each layer is preferably 1 wt % to 50 wt %, and preferably 5 wt % to 30 wt %. For more details regarding the inorganic filler contained in the supplementary layer, refer to the section "<Supplementary layer>" above.

Examples of the internal lubricant include calcium stearate, magnesium stearate, and hydrates thereof such as sodium 12-hydroxystearate. The preferable content of the internal lubricant is in the range of 50 ppm to 5000 ppm based on the total resin solid content forming each layer.

<Method for Obtaining Two Target Layers from Coextruded Original Membrane Having Three-Layer Structure of Target Layer/Supplementary Layer/Target Layer>

An example of a method for obtaining two target layers from a coextruded original membrane having a three-layer structure of target layer/supplementary layer/target layer, comprising two microporous membranes which are target layers and one supplementary layer, will be described. The example hereinafter includes a case where each target layer is a single layer containing polyethylene (PE) as a main component and the supplementary layer contains polypropylene (PP) as a main component. However, when each target layer is a multilayer membrane containing a resin other than polyethylene (PE) as a main component, as well as when the supplementary layer contains a resin other than polypropylene as a main component, two target layers can be obtained at once according to the following method. In the case of this three-layer structure, two extruders are required due to coextrusion. However, since two target layers are obtained in one extrusion, the method is very economical. Generally, only one casting apparatus and one stretching apparatus are required downstream from the extruders, and thus the equipment cost is greatly improved.

<Kneading/Extrusion/Coextrusion Step>

A starting material composition for obtaining a target layer, comprising a polyethylene starting material and a plasticizer blended in predetermined amounts, is extruded with one extruder. A resin starting material for obtaining a supplementary layer, comprising polypropylene as a main component blended with a plasticizer in predetermined amount or without being blended with any plasticizer, is extruded with another extruder. These extrudates are coextruded in a coextrusion die so as to obtain a three-layer structure of, for example, target layer/supplementary layer/target layer and then cast-molded to obtain a microporous original membrane before stretching (precursor of a microporous membrane laminate).

Examples of methods for kneading a resin composition starting material include a method in which a starting material resin and optionally a plasticizer are pre-kneaded with a Henschel mixer or a tumbler mixer, the kneaded product is charged into an extruder and heat-melted in the extruder while a plasticizer is introduced at any ratio as needed to obtain a predetermined amount, and the mixture is further kneaded. This method allows a sheet having satisfactory dispersibility of the resin composition to be obtained, and is preferable from the viewpoint that each of the target layer and the supplementary layer can be stretched at a high ratio without rupturing.

As the melt extruder, for example, a twin-screw extruder can be used, whereby a strong shearing force is applied to the resin composition and, when the starting material is a polymerized powder, dispersibility is further improved. The L/D of the screws of the twin-screw extruder is preferably about 20 to 70, and more preferably 30 to 60. Note that, L represents screw length and D represents screw diameter. Screws having a full flight portion and a kneading portion, generally a kneading disc or rotor, can be used. When the polymerized powder is already processed into pellets, a single-screw extruder can also be used.

The content of the plasticizer in the microporous membrane layer (target layer) in the extrusion step is involved in the permeation performance of the microporous membrane and, in the case of a separator for lithium-ion secondary cells, the output and cycle performance of a cell, and is preferably 40 wt % or more, more preferably 50 wt % or more, and even more preferably 60 wt % or more. However, when the amount of plasticizer is excessively large, a problem with membrane strength or, in the case of a separator for lithium-ion secondary cells where permeability becomes excessively large, a problem with micro-short circuit occurs. Thus, the content of the plasticizer in the target layer is preferably 90 wt % or less.

The content of the plasticizer in the supplementary layer during the extrusion step is preferably 60 wt % or less, more preferably 40 wt % or less, even more preferably 30 wt % or less, and still more preferably 20 wt % or less. When the plasticizer amount in the supplementary layer is more than 60 wt %, the gradient structure is difficult to realize, and the strength of the supplementary layer membrane is weakened, whereby the membrane easily ruptures during the peeling step. The content of the plasticizer in the supplementary layer should be more than 0 wt %, and can be, for example, 0.1 wt % or more, 0.5 wt % or more, 1 wt % or more, 3 wt % or more, or 5 wt % or more.

The die installed on the tip of an extruder is not particularly limited, but a T-die is used. When using inorganic particles or an inorganic filler or when using a resin composition that degrades easily, dies having measures to suppress wear or adhesion due to these materials, for example, Teflon™ processing, ceramic processing, nickel processing, molybdenum processing, or hard chrome coating on the flow path or lip are preferably used.

It is preferable that a coextrusion die be used as the die. In the case of a T-die, it is particularly preferable that a coat hanger multi-manifold die which spreads a molten resin into a membrane form inside the die and then merges the layers be used from the viewpoint of thickness control. A feedblock die or a crosshead die can also be used. From the viewpoint of preventing heat degradation, a spiral die is preferable in the case of a circular die, or a stack die is preferable in the case of a film having five or more layers among multilayer films.

It is preferable that the microporous membrane and the supplementary layer be coextruded with both in a molten state. In coextrusion, it is preferable to join both layers inside the die to form a multilayer. The ratio of melt viscosities of the two layers in contact with each other at the extrusion temperature and shearing rate is preferably ⅓ to 3/1, and more preferably ½ to 2/1. It is preferable to set the ratio of melt viscosities to the above ranges from the viewpoint of suppressing interfacial disturbance during resin merging and uneven thickness.

The thickness of the microporous original membrane (precursor of the microporous membrane laminate) obtained by coextrusion may be determined by the thickness of the ultimately desired target layer or the stretching ratio. Specifically, when obtaining a microporous membrane having, for example, a stretching ratio of 100 (area ratio) and a final thickness of 6 μm, the precursor of the microporous membrane laminate has a thickness of about 600 μm to 800 μm. This precursor is subjected to steps such as casting step/stretching step, extrusion/porosification step, heat setting step, peeling step, and application step to obtain a microporous membrane laminate. Hereinafter, each step will be described in detail.

<Casting Step/Stretching Step>

The molten resin extruded from a die can be, for example, introduced to a casting apparatus to form a microporous original membrane before co-stretching (precursor of a microporous membrane laminate). Subsequently, the microporous original membrane is co-stretched to impart high mechanical strength and a balance of longitudinal and transverse physical properties (co-stretching step). The stretching at this time is preferable biaxial stretching, and more preferably simultaneous biaxial stretching or successive biaxial stretching. The stretching temperature is in the range of preferably 100° C. to 155° C. or less, and more preferably 110° C. to 140° C. The stretching ratio is preferably 3-fold or greater to 200-fold or less in terms of the area ratio, from the viewpoint of membrane strength. By using a supplementary layer, the supplementary layer also contributes as a stretched supplementary layer, allowing a target layer having a thickness of about 3 μm to 6 μm, which is difficult to achieve with a general polyethylene film, to be stretched at 115° C. to 120° C. and achieving higher strength.

<Extrusion/Porosification Step>

The microporous original membrane before co-stretching or after co-stretching is immersed in an extraction solvent and porosified through the extraction of the plasticizer and/or inorganic filler (extraction/porosification step). Subsequently, the membrane is sufficiently dried. When extracting only the plasticizer, it is preferable that the extraction solvent be a poor solvent of the polyolefin starting resin and the inorganic filler and a good solvent of the plasticizer, and have a boiling point lower than the melting point of the starting resin. Examples of such an extraction solvent include chlorine-based solvents such as methylene chloride and 1,1,1-trichloroethane; ketones such as methyl ethyl ketone and acetone; halogen-based organic solvents such as hydrofluorocarbons, hydrofluoroethers, cyclic hydrofluorocarbons, perfluorocarbons, and perfluoroethers; ethers such as diethyl ether and tetrahydrofuran; hydrocarbons such as n-hexane and cyclohexane; and alcohols such as methanol and isopropyl alcohol. Two or more of these extraction solvents may be used. Of the above solvents, methylene chloride is particularly preferable. The porosification step may be carried out before or after the co-stretching step. The porosification step may be carried out by multistage extraction using a plurality of extraction tanks. Examples of the extraction solvent of the inorganic filler include alkaline water. The inorganic filler may remain in the microporous membrane or supplementary layer for the purpose of improving strength, or may be removed using an extraction tank.

<Heat Setting Step>

After extracting the plasticizer or the inorganic filler, heat setting by heat stretching may be carried out as needed to adjust membrane characteristics such as membrane thickness and air permeability or prevent heat shrinkage of the film. Examples of the stretching after extraction include uniaxial stretching, simultaneous biaxial stretching, successive biaxial stretching, and transverse uniaxial stretching. The stretching temperature is preferably 100° C. or higher and 155° C. or lower. The stretching ratio is preferably greater than 1-fold and 10-fold or less in terms of the area ratio. When carrying out a heat treatment to stabilize the dimensions of the microporous membrane, in order to reduce the membrane shrinkage in a high-temperature atmosphere, heat treatment can be carried out, for example, at a temperature of 100° C. or higher and 150° C. or lower using a biaxial stretcher, a uniaxial stretcher, or both. Preferably, heat treatment is carried out in a temperature range of the melting point or lower of the resin constituting the original membrane, the target layer, or the supplementary layer, in the width direction, the length direction, or both, by relaxing the ratio and/or stress of the membrane. The heat setting temperature is even more preferably at 110° C. or higher and 140° C. or lower, most preferably at 120° C. or higher and 140° C. or lower. In these ranges, the protrusions previously described are easily generated on the surface B.

<Peeling Step>

In the method for producing a microporous membrane, a microporous membrane (target layer) can be obtained after peeling off the supplementary layer by including a peeling step. As a method for separating the microporous membrane from a microporous membrane laminate, it is preferable that the microporous membrane laminate be introduced to a pinch roll of a winder and separated into a plurality of (for example, two or more) membranes on the outlet side of the roll. At this time, it is preferable that the roll be set so that the microporous membrane comes into contact with the pinch roll preferably at least at (a wrap angle of) 30 degrees or more, more preferably at 60 degrees to 120 degrees, and even more preferably at 80 degrees to 100 degrees after the peeling step.

When the peeling step is a step of peeling off a precursor sheet of the microporous membrane or the microporous membrane, which is the target layer, from the supplementary layer on the downstream side of the pinch roll, the peeling is always carried out on the roll. Thus, the point of peeling is stable, wrinkles do not easily form during peeling, and rupturing tends to be difficult even when peeling a thin membrane. It is preferable that a peeling roll be installed on a pinch roll used for peeling since the peeling tends to be more stable. At this time, the peeling rate is preferably 20 m/min or more, more preferably 50 m/min or more, and most preferably 100 m/min or more, from the viewpoint of productivity.

<Application Step>

From the viewpoint of further improving heat shrinkage characteristic of the microporous membrane after the peeling step, a coating layer can be formed on the surface of the microporous membrane. It is preferable that the coating layer be an inorganic filler layer containing an inorganic filler. The inorganic filler-containing coating material for forming such an inorganic filler layer is described in the section <Coating layer> above, and can be a liquid mixture of an inorganic filler and a binder.

The method for applying a liquid mixture containing an inorganic filler and a binder onto the microporous membrane is not particularly limited as long as the method can achieve the required layer thickness or coating area. Examples thereof include gravure coater method, small-diameter gravure coater method, reverse roll coater method, transfer roll coater method, kiss coater method, deep coater method, knife coater method, air doctor coater method, blade coater method, rod coater method, squeeze coater method, cast coater method, die coater method, screen printing method, and spray application method. In addition, an inorganic filler-containing coating material may be applied to only one side of the microporous membrane or both sides according to application. It is preferable that the coating layer be applied onto the surface B, which has a higher dynamic frictional resistance and a relatively smaller pore area compared to the surface A, from the viewpoint of adhesive strength of the coating layer and preventing the pores from clogging due to the coating material.

<<Separator for Electricity Storage Device>>

The microporous membrane of the present disclosure can be preferably used as a separator for lithium-ion secondary cells. The separator in the specification of the present application refers to a member arranged between a plurality of electrodes and having ion permeability and, as needed, shutdown characteristic in separators for electricity storage devices such as lithium-ion secondary cells. The microporous membrane is preferably arranged so that the surface A having a relatively large pore area faces the negative electrode and the surface B having a relatively high number of pores faces the positive electrode, whereby electrode degradation preventability tends to improve.

EXAMPLES

<<Measurement and Evaluation Methods>>

(1) Peel Strength of Microporous Membrane (Target Layer) and Supplementary Layer (Gf/25 mm Width)

Peel strength of a sample was measured using a tensile tester (manufactured by Shimadzu Corporation, AG-100A). The microporous membrane having a supplementary layer was cut into strips of 200 mm in the MD and 25 mm in the TD as samples. One end of each sample was peeled 20 mm with tape. A sample that could not be peeled at this point had a peel strength of more than 250 gf/25 mm, and was judged to be "not peelable". Each sample was further peeled 80 mm, and the two peeled ends were fixed to the chuck of the tensile tester in accordance with JIS K-7127, and the average load when peeling at a rate of 100 mm/min at a peeling angle of 180 degrees was read.

(2) Thickness of Each Layer (μm)

Using a micro-thickness meter (Type KBN, tip diameter Φ 5 mm, measurement pressure 62.47 kPa) manufactured by Toyo Seiki Seisaku-sho, Ltd., thickness of a sample was measured at an ambient temperature of 23±2° C. In the case where the microporous membrane was a multilayer membrane, when measuring the thickness of each layer, each layer was peeled off and then measured. For a sample in which a layer could not be peeled off, a cross-sectional photograph of the microporous membrane was observed with an "S4800" (manufactured by Hitachi, Ltd., trademarked) scanning electron microscope, and the thickness of each layer was read.

(3) Porosity (%)

Using a sample of the microporous membrane from which the supplementary layer was peeled off, basis weight W (g/cm$^2$) was calculated from the weight of a 100 mm square sample of the microporous membrane. The average density ρ (g/cm$^3$) of the components (resins and additives) constituting the microporous membrane was then calculated. From the average density ρ (g/cm$^3$) and the thickness of the microporous membrane d (cm), the porosity was calculated using the following formula.

$$\text{Porosity}=(W/(d\times\rho))\times100(\%)$$

(4) Air Permeability (Sec, Sec/100 ml/10 μm)

Using a sample of the microporous membrane from which the supplementary layer was peeled off, air permeability was measured with a Gurley type air-permeability tester "G-B2" (manufactured by Toyo Seiki Seisaku-sho, Ltd., trademarked) in accordance with JIS P-8117. In addition, the measured air permeability was converted in terms of membrane thickness of 10 μm.

(5) Viscosity-Average Molecular Weight

The limiting viscosity [η] (dl/g) at 135° C. in a decalin solvent was determined based on ASTM-D4020.

For polyethylene, [η] was calculated by the following formula.

$$[\eta]=6.77\times10^{-4}\,M v^{0.67}$$

For polypropylene, Mv was calculated by the following formula.

$$[\eta]=1.10\times10^{-4}\,M v^{0.80}$$

(6) Pore Area ($S_A$, $S_B$), Number of Pores ($N_A$, $N_B$), and Pore Size ($\Phi_A$, $\Phi_B$) of Microporous membrane
<Selection of Area of Measurement by Scanning Electron Microscope (SEM)>

The surface of a microporous membrane was coated with osmium. Next, a scanning electron microscope "S4800" (Hitachi, Ltd., trademarked) with the acceleration voltage set to 1 kV and the detection signal set to secondary electrons was used to observe any five sites on the surface A and B of the microporous membrane (total of ten sites). Note that, the imaging area was a plane rectangular area of 9.6 μm in length×12.8 μm in width on the surface of the microporous membrane, and the magnification was 10,000 times. From the photograph, a rectangular area of 8 μm in length×12.5 μm in width (100 square win) was cut and selected as a measurement area. The number of pores was converted into a number per square μm.
<Image Analysis>

The captured image was binarized by the Otsu method using the public domain image processing software ImageJ (National Institutes of Health). The number and size of all the pores thus appeared were measured to determine $S_A$, $S_B$, $S_A/S_B$, $N_A$, $N_B$, $N_A/N_B$, $\Phi_A$, and $\Phi_B$. Pores straddling within the measurement area and outside the measurement area were excluded from measurement. For the numbers ($N_A$ and $N_B$) of pores, the average value measured in two measurement areas for the surface A and the average value measured in two measurement areas for the surface B were designated as $N_A$ and $N_B$, respectively. For the pore area ($S_A$ and $S_B$), the average value of all pore areas in the measurement area was determined. For the pore size ($\Phi_A$ and $\Phi_B$), the distance between two farthest points of any two points on the contour of a pore was measured, and the average value for all the pores in the measurement area was determined.

(7) Size and Numbers $W_A$ and $W_B$ of Protrusions
<Selection of Area of Measurement by Scanning Electron Microscope (SEM)>

The surface of a microporous membrane was coated with osmium. Next, a scanning electron microscope "S4800" (Hitachi, Ltd., trademarked) with the acceleration voltage set to 1 kV and the detection signal set to secondary electrons was used to observe any two sites on the surface A and B of the microporous membrane (total of four sites). Note that, the imaging area was a plane rectangular area of 9.6 μm in length×12.8 μm in width on the surface of the microporous membrane, and the magnification was 10,000 times. From the photograph, a rectangular area of 8 μm in length×12.5 μm in width (100 square μm) was cut and selected as a measurement area.
<Image Analysis>

The captured image was binarized by the same image analysis method as in (6) Pore area of microporous membrane. The size of a protrusion appearing within the above measurement area was measured. In the image of the microporous membrane taken, a protrusion having a circumscribed circle diameter of more than 0.2 μm was measured. The distance between two farthest points of any two points on the contour of a protrusion was defined as the size of the protrusion. The sizes of all protrusions to be measured which appeared within the measurement area were measured, and the average value was calculated. The protrusions straddling within the measurement area and outside the measurement area were excluded from measurement. The average value of the sizes of the protrusions measured in two measurement areas for the surface A was designated as the average size of the protrusions on the surface A, and the average value of the sizes of the protrusions measured in two measurement areas for the surface B was designated as the average size of the protrusions on the surface B. Of the protrusions measured above, the number of protrusions having a size of 0.2 μm or more was counted in an area of 100 μm² for each of the surfaces A and B. The average value of the number of protrusions measured in two measurement areas for the surface A and the average value of the number of protrusions measured in two measurement areas for the surface B were designated as $W_A$ and $W_B$, respectively.

(8) MFR (Melt Flow Rate)

The MFR of the resin was measured in accordance with HS K7210. Polyethylene was measured according to Code D (190° C., 2.16 kgf load), and polypropylene was measured according to Code M (230° C., 2.16 kgf load).

(9) Puncture Strength (Gf/10 μm)

Using a handy compression tester "KES-G5" (manufactured by Kato Tech Co., Ltd., trademarked), a puncture test under the conditions of radius of curvature of the needle tip of 0.5 mm and puncture rate of 2 mm/sec was carried out, whereby the puncture strength of a sample was measured. Further, a value obtained by converting the measured puncture strength in terms of 10 μm thickness was determined.

(10) Dynamic Friction Coefficient

Using a friction tester "KES-SE" (manufactured by Kato Tech Co., Ltd., trademarked), measurement under the conditions of load of 50 g, contact area of 10×10=100 mm², contact feed speed of 1 mm/sec, tension of 6 kPa, temperature of 23° C., and humidity of 50% was carried out. The contact is a sensor portion of the friction tester, and is made by winding twenty 0.5 mmφ hard stainless-steel SUS304 piano wires around a metal block so as not to overlap each other without a gap. One surface of the block after winding is designed to have an area of 10×10=100 mm², and the surface is brought into contact with the surface of the sample. For a sample having a size of MD 50 mm×TD 200 mm, both sides (surface A and surface B) were measured three times in the TD direction, and the average value of each side was determined to obtain a dynamic friction coefficient.

(11) Winding Core Removability (Cell Winding Property)

FIG. 4 is a schematic diagram showing a method for evaluating winding core removability in the specification of the present application. FIG. 4(A) is a schematic diagram showing the entire configuration of a hand-operated winder (manufactured by KAIDO MFG. CO., LTD.). Two microporous membranes (21) each having a length of 3 m and a width of 60 mm were stacked and wound five times around the center of a SUS304 pin (20) having a diameter of 20 mm, and a load of 400 g was applied to the free end. FIG. 4(B) is a vertical cross-sectional view (specifically, X-Y cross-sectional view shown in FIG. 4A) in the longitudinal direction of the center portion of the pin (20) around which the microporous membrane (21) is wound. The pins I (22) and II (23) constituting the pin center portion are shapes of the cylindrical pin (20) split into two at the circular center, are structures that open up and down with each other to form a slit, and become a cylindrical pin (20) upon reintegration. An end portion (24) of the microporous membrane (21) is inserted into the slit portion, the pin I (22) and the pin II (23)

are pinched to fix the end portion of the microporous membrane (21), and the microporous membrane (21) is wound around the pin. Note that, in FIG. 4(B), for illustration purposes only, the pins I and II and the end portion of the microporous membrane have gaps therebetween, but in reality, are in contact with each other. The pin I (22) was pulled out from the wound microporous membrane (21) to the right in FIG. 4(B) at a rate of 10 mm/sec, the microporous membrane (21) was then manually pulled off and removed from the pin II (23), and the removed microporous membrane wound body was observed. Ten wound bodies were evaluated for the same microporous membrane. The pin removal characteristic was evaluated according to the following criteria.
- A: The microporous membrane portion in contact with the pin is pulled by the pin, and number of wound bodies that is displaced by 1 mm or more from before the pin is pulled out is 0/10.
- B: The microporous membrane portion in contact with the pin is pulled by the pin, and number of wound bodies that is displaced by 1 mm or more from before the pin is pulled out is 1/10 or 2/10.
- C: The microporous membrane portion in contact with the pin is pulled by the pin, and number of wound bodies that is displaced by 2 mm or more from before the pin is pulled out is 3/10 or greater.

(12) Slip Phenomenon

Figure 5:
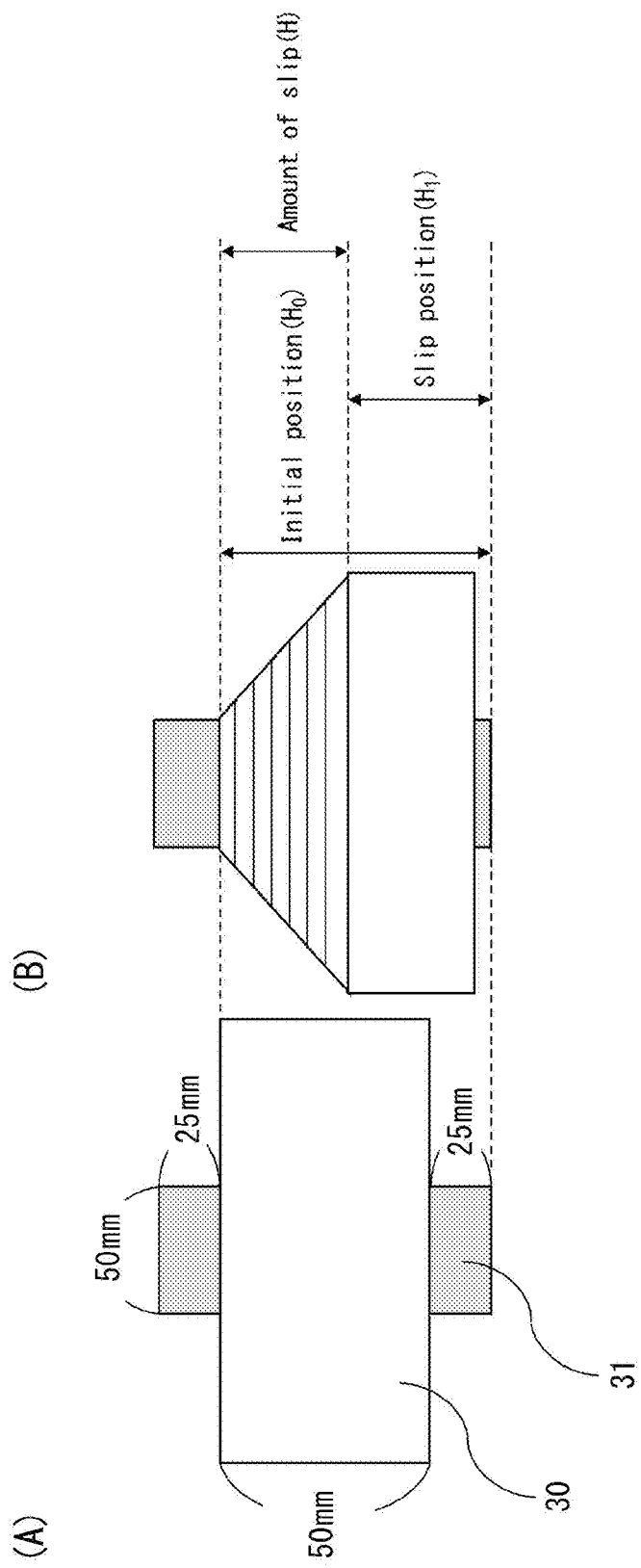
FIG. 5 is a schematic diagram showing a method for evaluating slip phenomenon in the specification of the present application.

FIG. 5 is a schematic diagram showing a method for evaluation the slip phenomenon in the specification of the present application. As shown in FIG. 5(A), a microporous membrane (30) having a width of 50 mm and a length of 1500 m was wound around the center of a winding shaft (31) at a winding tension of 0.03 N, and the outermost end of the membrane was fixed to the outer surface thereof. Note that, a paper tube having a diameter of 50 mm and a length of 100 mm was used for the winding shaft. The wound body of the wound microporous membrane was allowed to stand in an environment of room temperature at 23° C. and humidity of 55% for 24 hours. Subsequently, the winding shaft was set vertically, raised 100 mm in the vertical direction, and dropped naturally as it was. The amount of slip of the outermost layer due to the impact of the drop was measured. Specifically, as shown in FIG. 5(B), the initial height ($H_0$) and the slip position ($H_1$) after the drop were measured, the value immediately after the measurement was measured, and the amount of slip (H) was determined by the following formula.

Amount of slip($H$)=Initial position($H_0$)−Slip position ($H_1$)

[Evaluation of Slip Phenomenon]

The slip phenomenon was evaluated from the amount of slip (H) of the end surface (side surface) of the wound roll by the following criteria.
- A: The amount of slip is 1 mm or less.
- B: The amount of slip is more than 1 mm and 2 mm or less.
- C: The amount of slip is more than 2 mm.

(13) Transportability

FIG. 6 is a schematic diagram showing the apparatus (40) for evaluating transportability in the specification of the present application. FIG. 6(A) is a schematic diagram of the apparatus viewed from the side. FIG. 6(B) is a schematic diagram of the apparatus viewed from above. The apparatus comprises a fixed bar (41) made of SUS304 having a diameter of 20 mm and a centerline average surface roughness (Ra) of 6.3 µm or less and a drive-operated winding shaft (42). The surface B of the microporous membrane (43) was set so as to make contact with the upper portion of the fixed bar at an angle of 120 degrees, and the microporous membrane having a width of 50 mm was wound around the drive-operated winding shaft at 30 m/min for 1 min. At this time, a membrane with poor transportability is caught and vibrated at the upper portion of the fixed bar 15, and winding slip (44) at both ends of the microporous membrane wound by the drive-operated winding shaft is observed, while a membrane with satisfactory transportability has little winding slip. Note that, the winding slip is the total value of both ends of the microporous membrane. Transportability was evaluated by the following standards.
- A: The winding slip during transport is less than 2 mm.
- B: The winding slip during transport is 2 mm or more.

(14) Ratios $NC_A$, $NC_B$, and $NC_M$ of Number of Pores Having Pore Area of 0.12 µm or More on Microporous Membrane Cross-Section A cross-section sample from the microporous membrane was prepared by a BIB ion milling method. The cross-section sample was coated with 0.3 nm osmium. The cross-section sample of the microporous membrane was then observed at any five points with a scanning electron microscope (S4100 manufactured by Hitachi, Ltd.) at 30,000 times magnification. In the thickness direction of the microporous membrane cross-section, when a position on the surface A was set as 0% and a position on the surface B was set as 100%, the region of 0% to 10% was defined as "vicinity of the surface A", the region of 45% to 55% was defined as "vicinity of the center", and the region of 90% to 100% was defined as "vicinity of the surface B". The number of pores and the pore sizes were measured, and the ratios of pores having a pore size of 0.12 µm or more in a vicinity of the surface A, in a vicinity of the center, and in a vicinity of the surface B on the microporous membrane cross-section: $NC_A(0.12)$, $NC_M(0.12)$, $NC_B(0.12)$, and $NC_A(0.12)/NC_B(0.12)$, were determined.

Figure 7:
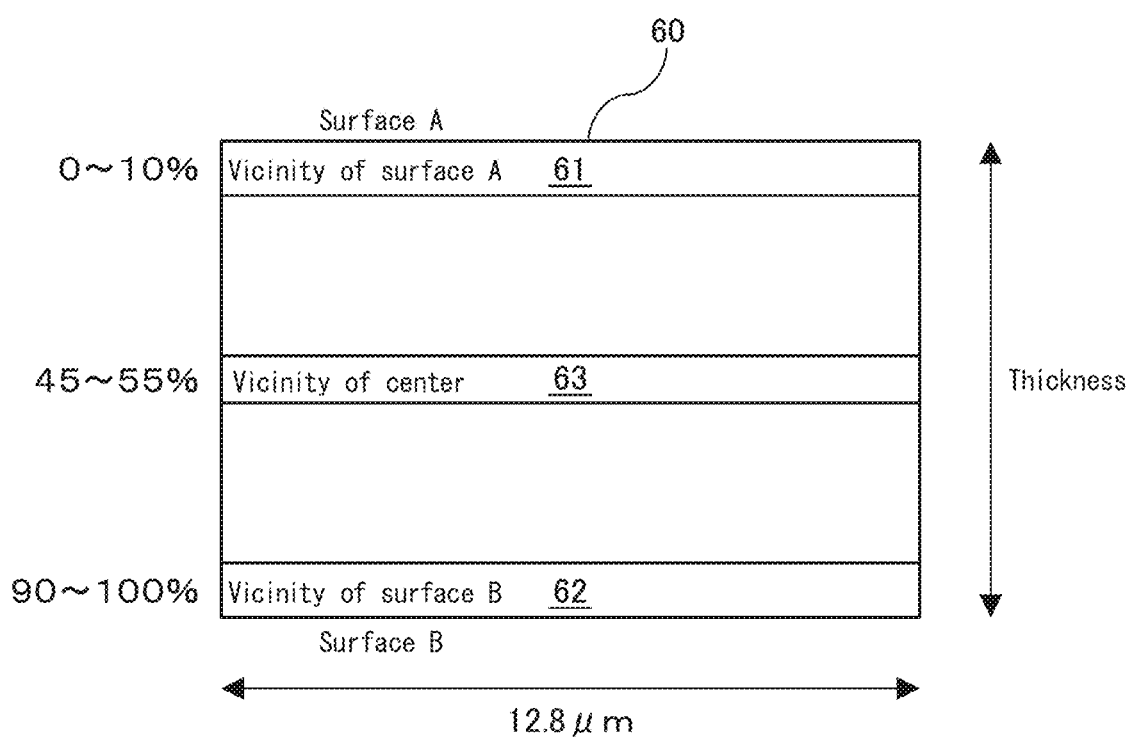
FIG. 7 is a schematic diagram of a cross-section of a microporous membrane for describing a method for measuring the gradient structure in the specification of the present application.

FIG. 7 is a schematic diagram of a cross-section of the microporous membrane for describing a method for measuring the gradient structure in the specification of the present application. The total number of pores in an area (60) of the microporous membrane thickness×12.8 µm, shown schematically in FIG. 7, was counted. Of the pores contained in the rectangle (61) indicating the region in a vicinity of the surface A in FIG. 6, the number of pores having a pore size of 0.12 µm or more was counted, which was then divided by the total number of pores to obtain $NC_A(0.12)$ in %. The regions in a vicinity of the surface B (62) and in a vicinity of the center (63) were measured in the same manner, and $NC_B$ and $NC_M$ were determined. Measurements were taken at any five points from the cross-section of the microporous membrane, and an average value of each region was calculated.

The imaging conditions were acceleration voltage of 0.8 kV, W. D of 3 to 5 mm, and LA of 3%. The pore size was measured as a distance between the two farthest points out of any two points on the contour of each micropore in each region. Micropores straddling between an imaging area and a non-imaging area were excluded from measurements. The image processing software ImageJ (National Institute of Health) was used for image analysis, and Otsu's method was used for binarization. Further, pores straddling between a measurement portion and a non-measurement portion were excluded from measurement. The threshold value was set to 0.001 µm2 or more, and pores smaller than this value were excluded from measurement.

(15) Electrode Degradation Preventability

The short-circuit preventability described below was defined as electrode degradation preventability.

a. Fabrication of Positive Electrode

A slurry was prepared by dispersing 92.2 wt % of a lithium cobalt composite oxide ($LiCoO_2$) as a positive electrode active material, 2.3 wt % of each of flaky graphite and acetylene black as conductive materials, and 3.2 wt % of polyvinylidene fluoride (PVDF) as a resin binder in N-methylpyrrolidone (NMP). The slurry was applied onto one side of a 20 μm-thick aluminum foil as the positive electrode current collector using a die coater, and then dried at 130° C. for 3 min, followed by compression molding using a roll press. At this time, the active material application amount on the positive electrode was adjusted to 125 g/m² and the active material bulk density was adjusted to 3.00 g/cm³. The obtained molded body was punched into a disk shape having an area of 2.00 cm².

b. Fabrication of Negative Electrode

Metallic lithium (Li) was used as a negative electrode active material and punched into a disk shape having an area of 2.05 cm².

c. Nonaqueous Electrolyte Solution $LiPF_6$ was dissolved as a solute at a concentration of 1.0 mol/L in a mixed solvent of ethylene carbonate:ethylmethyl carbonate=1:2 (volume ratio) to prepare a nonaqueous electrolyte solution.

d. Cell Assembly and Evaluation

The negative electrode, the separator, and the positive electrode were stacked in this order from the bottom along a vertical direction so that the active material surfaces of the positive and negative electrodes face each other, and the stack was housed in a stainless-steel container with a lid. At this time, a separator was installed so that the surface A faces the negative electrode. The container and the lid were insulated from each other, while the container was in contact with the copper foil of the negative electrode and the lid was in contact with the aluminum foil of the positive electrode. The nonaqueous electrolyte solution prepared in c. was injected into and sealed in the container.

The cell assembled as described above was charged at 4.3 V_constant current (CC)-constant voltage (CV) (cut off condition: convergent current value of 0.03 mA) with a set current value of 0.1 C, and then measured for normal charge amount (i).

A new cell was fabricated separately from the cell measured for normal charge amount and was charged at 4.3 V_CC-CV (cut off condition: 25 mAh or convergent current value of 0.03 mA) with a set current value of 20 mA/cm². The overload charge value (ii) was then measured.

The value of (ii)-(i) was evaluated as the overcharge value due to short circuit, according to the following criteria.

A: less than 0.9 mAh
B: 0.9 mAh or more and less than 1.0 mAh
C: 1.0 mAh or more

EXAMPLES AND COMPARATIVE EXAMPLES

The materials used in the Examples and Comparative Examples are as shown in the following Table 1.

| Material | Description |
| --- | --- |
| PE1 | High-density polyethylene having a viscosity-average molecular weight of 250000, MI = 0.05 (JIS K7112, 190° C., 2.16 kg load) |
| PE2 | Ultra-high molecular weight polyethylene having a viscosity-average molecular weight of 800000 |
| PP1 | Isotactic polypropylene, MFR = 0.8 (JIS K7112, 230° C., 2.16 kg load) |
| PP2 | Isotactic polypropylene, MFR = 0.4 (JIS K7112, 230° C., 2.16 kg load) |
| EL1 | Random-copolymerized polypropylene elastomer, MFR = 4 (JIS K7112, 230° C., 2.16 kg load) |
| Filler | Talc, average particle size: 3 μm |
| Plasticizer | Liquid paraffin (molecular weight: 360) |

Example 1

A single-layer microporous membrane was produced without using a supplementary layer. Specifically, a target layer 1 having the composition shown in Table 2 was independently extruded at an extrusion temperature of 200° C. and subjected to simultaneous biaxial stretching at a temperature of 123° C., had a plasticizer extracted and removed therefrom, and was re-stretched at a temperature of 135° C. and formed into a membrane to obtain a microporous membrane. Polyethylene for a monofilament having a melt index (MI)=0.8 and a density of 0.954 g/cm³ was extruded from a spinneret having a diameter of 2 mm at an extrusion temperature of 200° C. using a single-screw extruder having an L/D=30. The extruded resin was used as a bare yarn having a diameter of 40 μm) on a cooling roll and stretched 10-fold to obtain a polyethylene fiber having a diameter of 4 μm. The obtained polyethylene fiber was then pulverized to obtain a powder having a maximum length of 5 μm. This powder was applied in a predetermined amount to one side (designated surface B) of the microporous membrane formed as previously described and pressed at 120° C. and a pressure of 0.11 MPa, while care was taken not to occlude micropores with the pressure. The characteristics of the microporous membrane obtained as such are shown in Table 3. This microporous membrane had dynamic friction coefficients $F_A$ and $F_B$ and $F_B/F_A$ in the ranges of the present disclosure. In addition, the number of pores, pore area, and protrusions were in the preferable ranges of the present disclosure, and the winding core removability of the surface A and the adhesion thereof to the electrode of the surface B were both satisfactory. However, since the pore structure was not a gradient structure, electrode degradation characteristic was not improved.

Examples 2 to 11

A microporous membrane laminate having a three-layer structure of target layer/supplementary layer/target layer was produced. To distinguish between the two target layers in the extruded original membrane of the three-layer coextrusion, the target layer on the side where the original membrane discharged from the die at about 150° C. to about 230° C. was brought into contact with the cooling roll of the casting apparatus (hereinafter, referred to as "cast roll") was designated as target layer X, and the opposing target layer was designated as target layer Y. Note that, when both sides are brought into contact with the cast roll, the side where the molten resin original membrane is brought into contact with the cast roll for a long time is referred to as target layer X. A portion of a microporous membrane production line using a die, a casting apparatus, and a microporous membrane laminate is shown in FIG. 2.

Starting resins (resin components) were blended in the blending ratios (parts by weight) shown in Table 2. In addition, 0.3 parts by weight of tetrakis-[methylene-(3',5'-di-t-butyl-4'-hydroxyphenyl)propionate]methane as an antioxidant was blended with 100 parts by weight of the resin components. These starting materials were stirred with a Henschel mixer to prepare starting materials.

The starting materials of the target layer and the supplementary layer were then charged into two twin-screw extruders (opening diameter of 44 mm, L/D=49), respectively. In the middle portion of the cylinder of each extruder, liquid paraffin as a plasticizer was added to the composition shown in Table 2. The amount of liquid paraffin in the target layer was 65 wt % based on the total weight of the target layer. The amount of liquid paraffin in the supplementary layer was 20 wt % based on the total weight of the supplementary layer. The physical properties of the obtained target layers X and Y are shown in Tables 3 and 4. The reduction in slip phenomenon and the transportability of the microporous membrane of Examples 2 to 11 were both achieved and satisfactory. Further, because the pore structure had a gradient structure, electrode degradation prevention was also improved.

TABLE 2

Composition of resin and filler components of each layer (not including plasticizer)

Resins and filler (wt %)

|  | PE1 | PE2 | PP1 | PP2 | EL1 | Filler | Total |
|---|---|---|---|---|---|---|---|
| Target layer 1 | 40 | 40 | 20 | 0 | 0 | 0 | 100 |
| Target layer 2 | 10 | 90 | 0 | 0 | 0 | 0 | 100 |
| Supplementary layer 1 | 0 | 0 | 0 | 80 | 10 | 10 | 100 |

FIG. 2 schematically shows a portion of the microporous membrane production line. A screen changer with a 200-mesh screen and a gear pump were arranged between an extruder and a die (1). A multi-manifold die capable of dual-type, three-layer coextrusion was used as the die (1). The die (1) was designed so that three layers were arranged one-to-one-to-one therein, whereby surface layers (target layers) were stacked on both sides of an intermediate layer (supplementary layer). A molten film original membrane (3) discharged from the die (1) was cooled and solidified by a cast roll (2) to form a sheet having a total thickness of 2 mm. Note that, the cast roll temperature was set at 90° C. The side of the molten film original membrane (3) in contact with the cast roll (2) is target layer X (3i), and the side opposite the inner layer is target layer Y (3o).

The sheet was stretched to an area ratio of 50-fold at equal longitudinal and transverse ratios with a simultaneous biaxial stretcher at 123° C. Thereafter, the stretched sheet was immersed in methylene chloride to extract and remove liquid paraffin and then dried. The dried sheet was further stretched 1.5-fold in the transverse direction with a small-sized stretcher at 125° C. to 135° C. The stretched sheet was relaxed in the width direction by 7% at 135° C. and then heat-treated, whereby a microporous membrane laminate having a dual-type, three-layer structure in which the two surface layers (target layer X and target layer Y) had substantially the same composition and the intermediate layer different therefrom was obtained. The film winding rate was 10 m/min.

Figure 3:
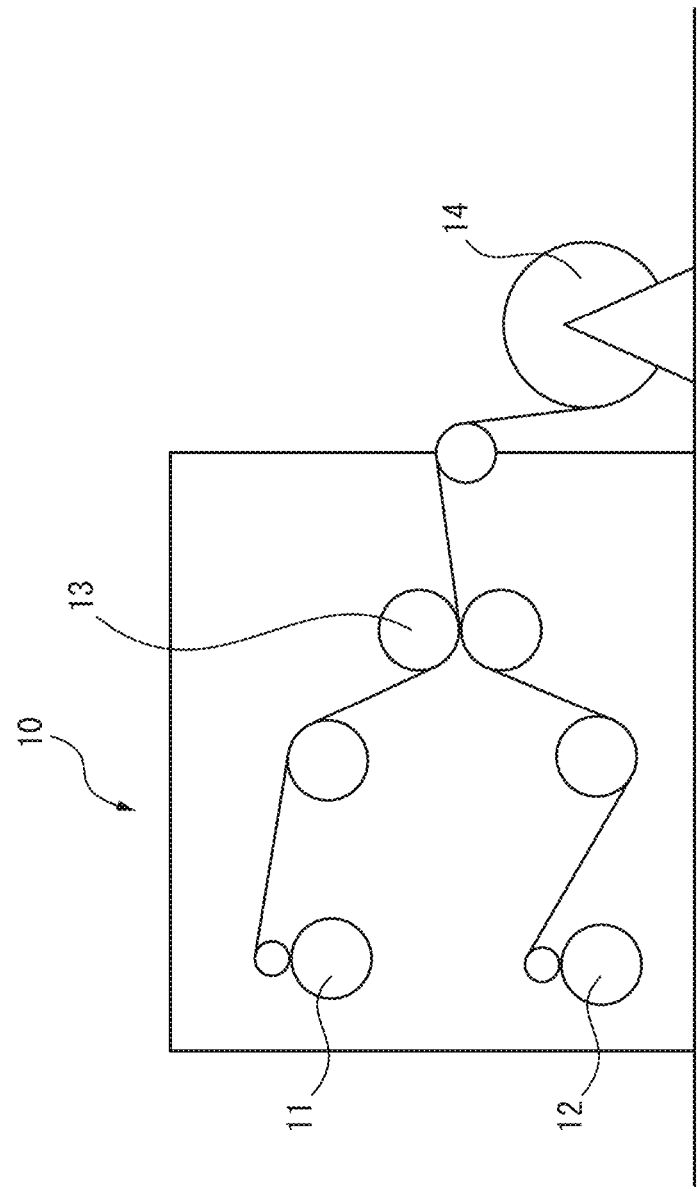
FIG. 3 is a schematic diagram of a winder for peeling a microporous membrane laminate.

FIG. 3 schematically shows a winder for peeling the microporous membrane laminate. The microporous membrane laminate was introduced from a feeder (14) of the winder (10) for peeling the microporous membrane laminate to a pinch roll (13) and separated into two membrane sheets, a single-layer membrane of the target layer X (winding upper shaft (11) side) and a two-layer membrane of the supplementary layer/target layer Y (winding lower shaft (12) side), on the outlet side of the pinch roll. The two-layer membrane was further guided to another pinch roll, where the supplementary layer and the target layer Y were peeled into separate layers. Although the peeling rate was 20 m/min, the peeling points were stable, the membrane did not rupture, no abnormal noise was generated during peeling, and the end faces of the wound single target layer (microporous membrane X) and of the wound body of the supplementary layer and the target layer (microporous membrane Y) were aligned without any misalignments. After peeling the microporous membrane, the pinch roll was adjusted so that the microporous membrane was in contact therewith at a wrap angle of 90° or 120°. The physical properties of the obtained microporous membrane X and microporous membrane Y are shown in Table 3.

As described above, the microporous membrane of the present disclosure had satisfactory winding core removability of the surface A, reduced slip phenomenon, satisfactory transportability, and satisfactory physical properties required for a separator such as puncture strength and air permeability. In Examples 2 to 11, two target layers could be produced in a single membrane production, which was economically satisfactory for a separator in cells. As shown in Table 3, these effects are presumably due to the fact that while the microporous membrane of the present disclosure is made of the same material on the front and back, the dynamic friction coefficient on the front and back can be adjusted separately, which is a characteristic that did not exist in the past. SEM photographs of the surface A and the surface B of the microporous membrane Y obtained in Example 2 are shown in FIG. 1. FIG. 1(a) is a SEM photograph of the surface A in Example 2. FIG. 1(b) is a SEM photograph of the surface B of the same microporous membrane, where protrusions (portions surrounded by ellipses in the figure) on the surface are found.

Examples 12 and 13

A membrane was produced by the same method as in Example 1 and with the composition of the target layer extrusion-molded by the same method as in Example 1. Note that, in Examples 12 and 13, the side that is brought into contact with the cast roll and rapidly cooled is referred to as surface B, and the other side that is slowly cooled by air is referred to as surface A. The physical properties of the membrane are shown in Table 3. In Examples 12 and 13, reduction in slip phenomenon and transportability were both achieved and satisfactory. However, since the pore structure was not a gradient structure, the electrode degradation characteristic did not improve.

Comparative Example 1

Polyethylene powder was not attached to the microporous membrane produced in Example 1. In Comparative Example 1, the dynamic friction coefficient was substantially the same for the surface A and the surface B. Therefore, an improvement in winding core removability, a reduction in slip phenomenon, and transportability could not be achieved at the same time.

| | | Example 1 | Example 2 | Example 3 | Example 4 | Example 5 | Example 6 | Example 7 | Example 8 | Example 9 | Example 10 | Example 11 | Example 12 | Example 13 | Comparative Example 1 |
|---|---|---|---|---|---|---|---|---|---|---|---|---|---|---|---|
| Layer structure | | Single layer | 3 layers | 3 layers | 3 layers | 3 layers | 3 layers | 3 layers | 3 layers | 3 layers | 3 layers | 3 layers | 3 layers | Single layer | Single layer |
| Target layer X | | Target layer 1 | Target layer 1 | Target layer 2 | Target layer 2 | Target layer 2 | Target layer 2 | Target layer 2 | Target layer 2 | Target layer 2 | Target layer 2 | Target layer 1 | Target layer 1 | Target layer 1 | Target layer 1 |
| Supplementary layer | | None | Supplementary layer 1 | Supplementary layer 1 | Supplementary layer 1 | Supplementary layer 1 | Supplementary layer 1 | Supplementary layer 1 | Supplementary layer 1 | Supplementary layer 1 | Supplementary layer 1 | Supplementary layer 1 | None | None | None |
| Target layer Y | | None | Target layer 1 | Target layer 2 | Target layer 2 | Target layer 2 | Target layer 2 | Target layer 2 | Target layer 2 | Target layer 2 | Target layer 2 | Target layer 1 | None | None | None |
| Properties and evaluation of target layer (microporous membrane) X of 10 μm | | | | | | | | | | | | | | | |
| Thickness | μm | 9.0 | 15.1 | 4.5 | 5.8 | 6.0 | 6.3 | 12.0 | 12.0 | 6.0 | 6.0 | 9.0 | 6.0 | 12.0 | 9.0 |
| Porosity | % | 45 | 50 | 38 | 44 | 44 | 43 | 33 | 33 | 45 | 45 | 45 | 45 | 45 | 45 |
| Air permeability | sec | 210 | 239 | 58 | 55 | 59 | 61 | 350 | 350 | 100 | 100 | 200 | 100 | 240 | 210 |
| Puncture strength | gf | 315 | 545 | 310 | 321 | 324 | 331 | 292 | 292 | 330 | 330 | 311 | 332 | 820 | 315 |
| Air permeability (in terms of 10 μm thickness) | sec/100 ml/10 μm | 233 | 158 | 129 | 95 | 98 | 97 | 587 | 587 | 167 | 167 | 222 | 167 | 200 | 233 |
| Puncture strength (in terms of 10 μm thickness) | gf/10 μm | 350 | 361 | 689 | 553 | 540 | 525 | 489 | 489 | 550 | 550 | 346 | 553 | 683 | 350 |
| Micropore size ΦB | nm | 33 | 33 | 32 | 32 | 33 | 34 | 40 | 40 | 34 | 34 | 31 | 34 | 32 | 33 |
| NA Number of pores | /μm² | 44 | 34 | 36 | 35 | 35 | 38 | 44 | 20 | 18 | 18 | 52 | 55 | 48 | 50 |
| NB Number of pores | /μm² | 49 | 60 | 47 | 48 | 51 | 55 | 110 | 110 | 60 | 60 | 38 | 53 | 47 | 49 |
| NA/NB | | 0.90 | 0.57 | 0.77 | 0.73 | 0.69 | 0.69 | 0.40 | 0.18 | 0.30 | 0.30 | 1.37 | 1.04 | 1.02 | 1.02 |
| SA Pore area | μm²/μm² | 0.083 | 0.130 | 0.095 | 0.095 | 0.110 | 0.100 | 0.065 | 0.030 | 0.110 | 0.110 | 0.052 | 0.050 | 0.046 | 0.083 |
| SB Pore area | μm²/μm² | 0.082 | 0.050 | 0.055 | 0.034 | 0.040 | 0.042 | 0.021 | 0.021 | 0.010 | 0.010 | 0.083 | 0.053 | 0.045 | 0.081 |
| SA/SB | | 1.0 | 2.6 | 1.7 | 2.8 | 2.8 | 2.4 | 3.1 | 1.4 | 11.0 | 11.0 | 0.6 | 0.9 | 1.0 | 1.0 |
| NCA(0.12) Cross-sectional number of pores | % in rectangle | 24 | 4.9 | 3.0 | 3.1 | 4.0 | 8.0 | 5.0 | 3.5 | 2.0 | 2.0 | 24 | 24 | 22 | 23 |
| NCM(0.12) Cross-sectional number of pores | % in rectangle | 23 | 3.2 | 2.6 | 2.2 | 3.2 | 4.2 | 3.3 | 2.9 | 1.5 | 1.5 | 23 | 21 | 22 | 21 |
| Thickness | % in rectangle | 20 | 2.0 | 2.3 | 2.0 | 1.9 | 1.4 | 1.0 | 1.0 | 1.0 | 1.0 | 20 | 23 | 24 | 20 |
| NCA(0.10)/NCB(0.10) | | 1.20 | 2.45 | 1.30 | 1.55 | 2.11 | 5.71 | 5.00 | 3.50 | 2.00 | 2.00 | 1.20 | 1.04 | 0.92 | 1.15 |
| NCA(0.10) Cross-sectional number of pores | % in rectangle | 45 | 44 | 34 | 33 | 39 | 33 | 30 | 21 | 40 | 40 | 40 | 52 | 39 | 45 |
| NCM(0.10) Cross-sectional number of pores | % in rectangle | 42 | 53 | 45 | 45 | 48 | 42 | 45 | 33 | 45 | 45 | 44 | 40 | 35 | 43 |
| NCB(0.10) Cross-sectional number of pores | % in rectangle | 44 | 65 | 49 | 61 | 53 | 48 | 50 | 50 | 56 | 56 | 55 | 45 | 33 | 48 |
| ΦA Surface average pore size | nm | 130 | 145 | 142 | 133 | 145 | 118 | 123 | 77 | 144 | 144 | 104 | 134 | 144 | 123 |

-continued

| Property | Unit | | | | | | | | | | | | | | |
|---|---|---|---|---|---|---|---|---|---|---|---|---|---|---|---|
| ΦB Surface average pore size | nm | 132 | 89 | 110 | 100 | 85 | 100 | 90 | 98 | 100 | 65 | 98 | 135 | 142 | 139 |
| WA Number of protrusions on surface A | /100 μm2 | 0 | 0 | 0 | 0 | 0 | 0 | 0 | 0 | 0 | 0 | 0 | 0 | 0 | 0 |
| WB Number of protrusions on surface B | /100 μm2 | 25 | 35 | 6 | 5 | 10 | 60 | 18 | 210 | 335 | 77 | 10 | 15 | 15 | 0 |
| WB Size of protrusions on surface B | μm | 4 | 0.3 | 0.1 | 0.2 | 0.5 | 0.1 | 0.2 | 0.2 | 0.6 | 0.2 | 0.3 | 4 | 4 | (-) |
| Dynamic friction coefficient FA | [—] | 0.22 | 0.19 | 0.15 | 0.18 | 0.14 | 0.40 | 0.20 | 0.23 | 0.22 | 0.32 | 0.22 | 0.19 | 0.40 | 0.29 |
| Dynamic friction coefficient FB | [—] | 0.33 | 0.88 | 0.54 | 0.38 | 0.40 | 0.60 | 1.50 | 1.40 | 1.50 | 0.44 | 0.22 | 4.30 | 0.40 | 0.32 |
| Supplementary layer FB/FA | [—] | 1.5 | 4.6 | 3.6 | 2.1 | 2.9 | 1.5 | 7.5 | 6.1 | 6.8 | 1.4 | 1.0 | 22.6 | 1.0 | 1.1 |
| Supplementary layer air permeability | sec/100 ml | (—) | 9,000 | 53,000 | 20,000 | 23,000 | 35,000 | 2,000 | 33,000 | 39,000 | 67,000 | 45,500 | (—) | (—) | (—) |
| Winding core removability | | B | A | A | A | A | B | B | B | B | B | B | A | B | B |
| Slip phenomenon | | B | B | A | A | A | B | B | B | B | B | B | B | B | C |
| Transportability | | A | B | A | A | A | B | B | B | A | A | A | B | B | A |
| Electrode degradation preventability | | C | B | A | A | A | A | A | A | A | A | A | C | C | C |

| | | Example 2 | Example 3 | Example 4 | Example 5 | Example 6 | Example 7 | Example 8 | Example 9 | Example 10 | Example 11 |
|---|---|---|---|---|---|---|---|---|---|---|---|
| | | 3 layers | 3 layers | 3 layers | 3 layers | 3 layers | 3 layers | 3 layers | 3 layers | 3 layers | 3 layers |
| | Target layer X | Target layer 1 | Target layer 1 | Target layer 2 | Target layer 2 | Target layer 2 | Target layer 1 | Target layer 2 | Target layer 2 | Target layer 1 | Target layer 1 |
| | Supplementary layer | Supplementary layer 1 | Supplementary layer 1 | Supplementary layer 1 | Supplementary layer 1 | Supplementary layer 1 | Supplementary layer 1 | Supplementary layer 2 | Supplementary layer 2 | Supplementary layer 2 | Supplementary layer 1 |
| | Target layer Y | Target layer 1 | Target layer 1 | Target layer 2 | Target layer 2 | Target layer 2 | Target layer 1 | Target layer 2 | Target layer 2 | Target layer 1 | Target layer 1 |
| Properties and evaluation of target layer (microporous membrane) Y | | | | | | | | | | | |
| Thickness | μm | 8.9 | 15.0 | 4.4 | 5.8 | 5.9 | 6.3 | 12.2 | 12.0 | 5.9 | 9.0 |
| Porosity | % | 44 | 51 | 39 | 43 | 45 | 44 | 33 | 34 | 44 | 44 |
| Air permeability | sec | 199 | 237 | 312 | 320 | 315 | 67 | 345 | 340 | 101 | 198 |
| Puncture strength | gf | 316 | 550 | 125 | 97 | 97 | 341 | 300 | 290 | 323 | 305 |
| Air permeability (in terms of 10 μm thickness) Y | sec/100 ml/10 μm | 224 | 158 | | | | 106 | 283 | 283 | 171 | 220 |
| Puncture strength (in terms of 10 μm thickness) | gf/10 μm | 355 | 367 | 709 | 552 | 534 | 541 | 246 | 242 | 547 | 339 |
| Micropore size B | mm | 31 | 32 | 33 | 32 | 32 | 34 | 41 | 40 | 35 | 33 |
| NA Number of pores | /μm2 | 39 | 33 | 34 | 36 | 38 | 36 | 48 | 20 | 19 | 51 |
| NB Number of pores | /μm2 | 50 | 59 | 46 | 50 | 55 | 49 | 98 | 110 | 58 | 37 |

-continued

| | | | | | | | | | | | |
|---|---|---|---|---|---|---|---|---|---|---|---|
| NA/NB | | 0.78 | 0.56 | 0.74 | 0.72 | 0.69 | 0.73 | 0.5 | 0.2 | 0.33 | 1.38 |
| SA Pore area | μm2/μm2 | 0.082 | 0.131 | 0.094 | 0.095 | 0.112 | 0.094 | 0.064 | 0.030 | 0.112 | 0.054 |
| SB Pore area | μm2/μm2 | 0.073 | 0.052 | 0.065 | 0.032 | 0.041 | 0.042 | 0.022 | 0.021 | 0.011 | 0.084 |
| SA/SB | | 1.1 | 2.5 | 1.4 | 3.0 | 2.7 | 2.2 | 2.9 | 1.4 | 10.2 | 0.6 |
| NCA(0.12) Cross-sectional number of pores | % in rectangle | 4.0 | 4.8 | 3.1 | 3.1 | 3.9 | 7.8 | 4.8 | 3.5 | 2.3 | 23 |
| NCM(0.12) Cross-sectional number of pores | % in rectangle | 3.2 | 3.1 | 2.4 | 2.1 | 3.1 | 4.4 | 3.3 | 2.9 | 1.6 | 24 |
| NCB(0.12) Cross-sectional number of pores | % in rectangle | 2.1 | 2.0 | 2.5 | 2.3 | 1.8 | 1.5 | 1.1 | 1.0 | 1.1 | 18 |
| NCA(0.12)/NCB(0.12) | | 1.90 | 2.40 | 1.24 | 1.35 | 2.17 | 5.20 | 4.36 | 3.50 | 2.09 | 1.28 |
| NCA(0.10) Cross-sectional number of pores | % in rectangle | 39 | 41 | 33 | 32 | 38 | 35 | 31 | 21 | 43 | 40 |
| NCM(0.10) Cross-sectional number of pores | % in rectangle | 43 | 52 | 46 | 45 | 50 | 44 | 43 | 33 | 44 | 43 |
| NCB(0.10) Cross-sectional number of pores | % in rectangle | 45 | 60 | 50 | 65 | 54 | 49 | 50 | 50 | 50 | 56 |
| A Surface average pore size | nm | 117 | 146 | 134 | 130 | 154 | 119 | 127 | 77 | 143 | 102 |
| OB Surface average pore size | nm | 90 | 112 | 105 | 88 | 103 | 89 | 97 | 100 | 66 | 99 |
| WA Number of protrusions on surface A | /100 μm2 | 0 | 0 | 0 | 0 | 0 | 0 | 0 | 0 | 0 | 0 |
| WB Number of protrusions on surface B | /100 μm2 | 45 | 5 | 6 | 12 | 45 | 17 | 125 | 335 | 76 | 11 |
| WB Size of protrusions on surface B | μm | 0.3 | 0.1 | 0.1 | 0.5 | 0.1 | 0.2 | 0.2 | 0.6 | 0.2 | 0.3 |
| Dynamic friction coefficient FA | [—] | 0.20 | 0.18 | 0.17 | 0.13 | 0.38 | 0.21 | 0.26 | 0.22 | 0.34 | 0.23 |
| Dynamic friction coefficient FB | [—] | 0.90 | 0.51 | 0.39 | 0.41 | 0.58 | 1.66 | 1.50 | 1.50 | 0.44 | 0.22 |
| FB/FA | | 4.5 | 2.8 | 2.3 | 3.2 | 1.5 | 7.9 | 5.8 | 6.8 | 1.3 | 1.0 |
| Supplementary layer air permeability | sec/100 ml | (—) | (—) | (—) | (—) | (—) | (—) | (—) | (—) | (—) | (—) |
| Winding core removability | | A | A | A | A | B | B | B | B | B | B |
| Slip phenomenon | | B | A | A | A | B | B | B | B | B | B |
| Transportability | | B | A | A | A | B | B | B | B | A | A |

-continued

| Electrode degradation preventability | B | A | A | A | A | A | A | A | A |

From these results, the microporous membranes of the Examples demonstrate sufficient performance as separators for lithium-ion secondary cells and simultaneously achieve high strength for a thin membrane and prevention of micro-short circuit. It was also found that a plurality of microporous membranes can be obtained simultaneously without slowing down production rate.

INDUSTRIAL APPLICABILITY

The present disclosure provides a microporous membrane having superior cell productivity, in particular, removability from a winding core when producing a wound cell using a winding core and prevention of slip phenomenon of a separator in roll form, and a method for producing the same. The microporous membrane of the present disclosure can be suitably used as a separator for, in particular, lithium-ion secondary cells.

REFERENCE SIGNS LIST 1 die
2 cooling roll of casting apparatus (cast roll)
3 molten film original membrane
3i target layer X
3o target layer Y
10 winder
11 upper winding shaft
12 lower winding shaft
13 pinch roll
14 feeder
20 pin
21 microporous membrane
22 pin I
23 pin II
24 end portion of microporous membrane
30 microporous membrane
31 winding shaft
40 apparatus
41 fixed bar
42 drive-operated winding shaft
43 microporous membrane
44 winding slip
60 cross-section of microporous membrane
61 rectangle indicating region in the vicinity of surface A
62 rectangle indicating region in the vicinity of surface B
63 rectangle indicating region in the vicinity of center

The invention claimed is:

1. A microporous membrane having a surface A and a surface B opposite to the surface A,
wherein the microporous membrane is composed of a single layer,
wherein a ratio ($F_B/F_A$) of a dynamic friction coefficient of the surface B ($F_B$) to a dynamic friction coefficient of the surface A ($F_A$) is in a range of 1.2 to 20,
wherein the surface B has a plurality of protrusions, and a number of the protrusions per 100 μm$^2$ on the surface B ($W_B$) is in a range of 0.2/100 μm$^2$ to 100/100 μm$^2$.

2. The microporous membrane according to claim 1, wherein a number of pores per 1 μm$^2$ on the surface A ($N_A$) is 10/μm$^2$ to 100/μm$^2$, a number of pores per 1 μm$^2$ on the surface B ($N_B$) is 20/μm$^2$ to 200/μm$^2$, $N_A/N_B$ is 0.2 to 0.98, a sum of pore areas per 1 μm$^2$ on the surface A ($S_A$) is 0.02 μm$^2$ to 0.5 μm$^2$, a sum of pore areas per 1 μm$^2$ on the surface B ($S_B$) is 0.01 μm$^2$ to 0.3 μm$^2$, and $S_A/S_B$ is 1.1 to 10.

3. The microporous membrane according to claim 1, wherein the surface A has a dynamic friction coefficient ($F_A$) of 0.3 or less and the surface B has a dynamic friction coefficient ($F_B$) of 0.9 or less, and
the microporous membrane has a thickness of 3 μm to 18 μm, a porosity of 20% to 75%, a puncture strength of 300 gf/10 μm or more in terms of 10 μm thickness, and an air permeability of 30 sec/100 ml/10 μm to 1000 sec/100 ml/10 μm in terms of 10 μm thickness.

4. The microporous membrane according to claim 1, wherein the surface A has a plurality of protrusions, a number $W_A$ of the protrusions per 100 μm$^2$ on the surface A is less than 0.2/100 μm$^2$, a number $W_B$ of the protrusions per 100 μm$^2$ on the surface B is greater than 10×$W_A$, and
and the protrusions on the surface B have a size in a range of 0.01 μm to 5 μm when the surface B is observed from a front face.

5. The microporous membrane according to claim 1, wherein the protrusions on the surface B contain polyethylene or polypropylene as a main component.

6. The microporous membrane according to claim 1, wherein when a ratio (%) of a number of pores having a pore size of 0.12 μm or more to a total number of pores observed in a vicinity of the surface A in a cross-section of the microporous membrane is $NC_A(0.12)$, a ratio (%) of a number of pores having a pore size of 0.12 μm or more to a total number of pores observed in a vicinity of a center in a cross-sectional direction in the cross-section of the microporous membrane is $NC_M(0.12)$, and a ratio (%) of a number of pores having a pore size of 0.12 μm or more to a total number of pores observed in a vicinity of the surface B in the cross-section of the microporous membrane is $NC_B(0.12)$, then $NC_A(0.12)>NC_M(0.12)>NC_B(0.12)$,
$NC_A(0.12)>NC_B(0.12)>1.2$
$NC_A(0.12)$ is 2% to 5% and $NC_B(0.12)$ is 0.5% to 3.0%,
provided that when a position on the surface A is defined as 0% and a position on the surface B is defined as 100% in the thickness direction of a cross-section of the microporous membrane, the vicinity of the surface A means a region of 0% to 10%, the vicinity of the center means a region of 45% to 55%, and the vicinity of the surface B means a region of 90% to 100%.

7. The microporous membrane according to claim 1, wherein when a ratio (%) of a number of pores having a pore size of less than 0.1 μm to a total number of pores observed in a vicinity of the surface A in a cross-section of the microporous membrane is $NC_A(0.10)$, a ratio (%) of a number of pores having a pore size of less than 0.10 μm to a total number of pores observed in a vicinity of a center in a cross-sectional direction in the cross-section of the microporous membrane is $NC_M(0.10)$, and a ratio (%) of a number of pores having a pore size of less than 0.10 μm to a total number of pores observed in a vicinity of the surface B in the cross-section of the microporous membrane is $NC_B(0.10)$, then $NC_A(0.10)<NC_M(0.10)<NC_B(0.10)$,
provided that when a position on the surface A is defined as 0% and a position on the surface B is defined as 100% in the thickness direction of a cross-section of the microporous membrane, the vicinity of the surface A means a region of 0% to 10%, the vicinity of the center means a region of 45% to 55%, and the vicinity of the surface B means a region of 90% to 100%.

8. The microporous membrane according to claim 1, wherein the surface A and the surface B of the microporous membrane contain polyethylene as a main component, and the polyethylene comprises 5 wt % to 30 wt % of a component having a viscosity-average molecular weight of 2,000,000 or greater.

9. The microporous membrane according to claim 1, wherein the surface A and the surface B of the microporous membrane contain polyethylene as a main component, and the polyethylene contains 10 wt % or more of an ultra-high molecular weight polyethylene having a viscosity weight molecular weight of 500,000 to 900,000.

10. The microporous membrane according to claim 1, wherein the surface A and the surface B of the microporous membrane comprise 20 wt % or more of an ultra-high molecular weight component having a viscosity-average molecular weight of 1,000,000 or greater.

11. The microporous membrane according to claim 1, wherein when an average pore size of pores observed in the surface B of the microporous membrane is $\Phi_B$, $\Phi_B$ is in a range of 5 nm to 100 nm, when an average pore size of pores observed in the surface A of the microporous membrane is $\Phi_A$ and an average pore size of pores observed in the surface B of the microporous membrane is $\Phi_B$, $\Phi_A > \Phi_B$.

12. The microporous membrane according to claim 1, wherein the protrusions are fibril portions on the surface of the microporous membrane.

13. A method for producing the microporous membrane according to claim 1, comprising the following:
   a coextrusion step of molding a microporous original membrane comprising a target layer having a surface A and a surface B opposite to the surface A and a supplementary layer on the surface B of the target layer by coextrusion of the target layer and the supplementary layer, wherein the target layer contains 40 wt % or more of a plasticizer based on a total weight of the target layer and the supplementary layer contains 60 wt % or less of a plasticizer based on a total weight of the supplementary layer; and
   the following (a) to (c) in any order after the coextrusion step:
   (a) a stretching step of stretching the microporous original membrane;
   (b) an extraction step of extracting the plasticizer from the microporous original membrane in the presence of an extraction solvent; and
   (c) a peeling step of peeling the supplementary layer from the surface B of the target layer to obtain the target layer as a microporous membrane.

14. The method according to claim 13, wherein the target layer is a single layer, and
   a starting resin of the target layer contains polyethylene as a main component and a starting resin of the supplementary layer contains polypropylene as a main component, and
   wherein the plasticizer content in the target layer is 90 wt % or less, and/or the plasticizer content in the supplementary layer is more than 0 wt %.

* * * * *